(12) United States Patent
Ichimura et al.

(10) Patent No.: US 7,406,173 B2
(45) Date of Patent: Jul. 29, 2008

(54) QUANTUM COMMUNICATION APPARATUS AND QUANTUM COMMUNICATION METHOD

(75) Inventors: Kouichi Ichimura, Yokohama (JP); Noritsugu Shiokawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 846 days.

(21) Appl. No.: 10/676,160

(22) Filed: Oct. 2, 2003

(65) Prior Publication Data

US 2004/0131179 A1 Jul. 8, 2004

(30) Foreign Application Priority Data

Oct. 2, 2002 (JP) ............................. 2002-290107

(51) Int. Cl.
*H04K 1/00* (2006.01)
*G02B 6/28* (2006.01)
(52) U.S. Cl. ........................... 380/28; 380/30; 380/256; 385/24
(58) Field of Classification Search ............. 385/16–24, 385/33, 36; 372/6
See application file for complete search history.

(56) References Cited

U.S. PATENT DOCUMENTS

| 5,699,374 A | 12/1997 | Ichimura et al. |
| 5,898,720 A | 4/1999 | Yamamoto et al. |
| 2005/0111665 A1* | 5/2005 | Ichimura et al. ............. 380/256 |

FOREIGN PATENT DOCUMENTS

| JP | 03-040480 | 2/1991 |
| JP | 08-321810 | 12/1996 |
| JP | 09-139539 | 5/1997 |
| JP | 10-253670 | 9/1998 |

OTHER PUBLICATIONS

Duan, L. M. et al., "Long-Distance Quantum Communication With Atomic Ensembles and Linear Optics", Nature, vol. 414, pp. 413-418, (Nov. 22, 2001).
Bennett et al., "Quantum Cryptography," Scientific American (Oct. 1992), pp. 50-57.
Ekert, "Quantum Cryptography Based on Bell's Theorem," Physical Review Letters (Aug. 5, 1991), 67:661-663.
Furusawa et al., "Unconditional Quantum Teleportation," Science (Oct. 23, 1998), 282:706-709.
Notification of Reasons for Rejection from the Japanese Patent and Trademark Office, dated Mar. 27, 2007, in counterpart Japanese Patent Application No. 2003-344646.

* cited by examiner

*Primary Examiner*—Hemang Sanghavi
(74) *Attorney, Agent, or Firm*—Finnegan, Henderson, Farabow, Garrett & Dunner, L.L.P.

(57) ABSTRACT

A quantum communication apparatus is used in operations to generate entanglement between the two physical system ensembles and operations to extend the distance between entangled ensembles by connecting pairs of entangled ensembles. The apparatus uses only passive elements without any actuating parts, active devices having no mechanically actuating parts, such as an electro-optical device capable of ultrahigh-speed operation, and a laser source capable of generating high-speed pulse trains or a continuous wave laser source. The apparatus can rapidly execute light irradiation necessary for entanglement generation and connection, and detection of a generated photon at the needed sites within a decoherence time of the physical system.

13 Claims, 10 Drawing Sheets

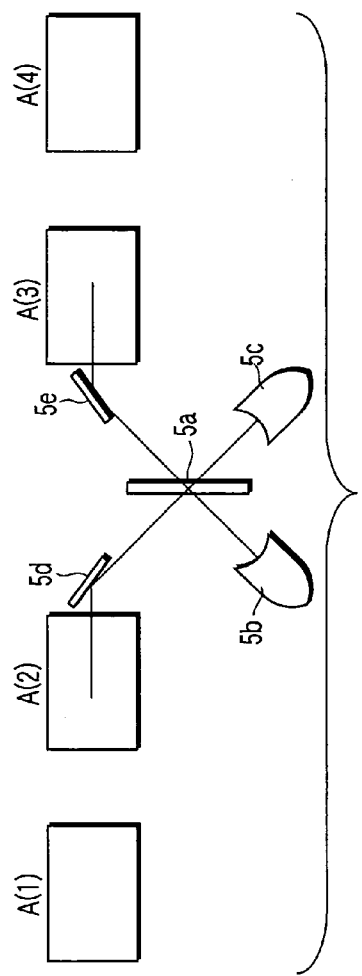
F I G. 5
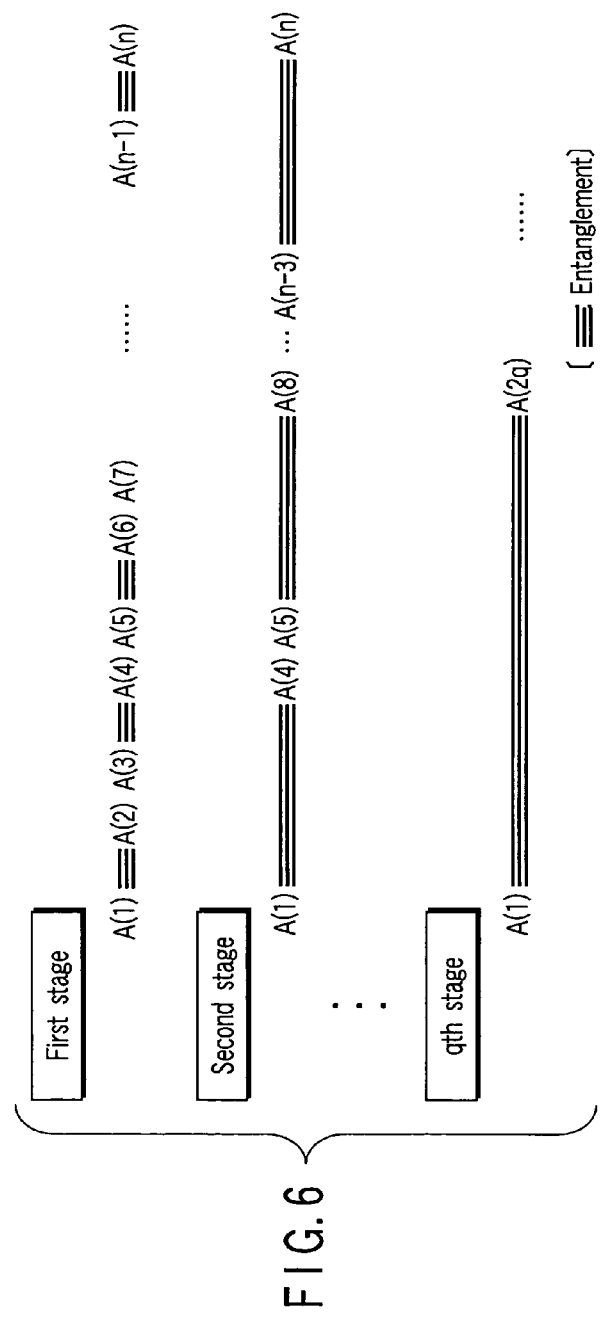
F I G. 6

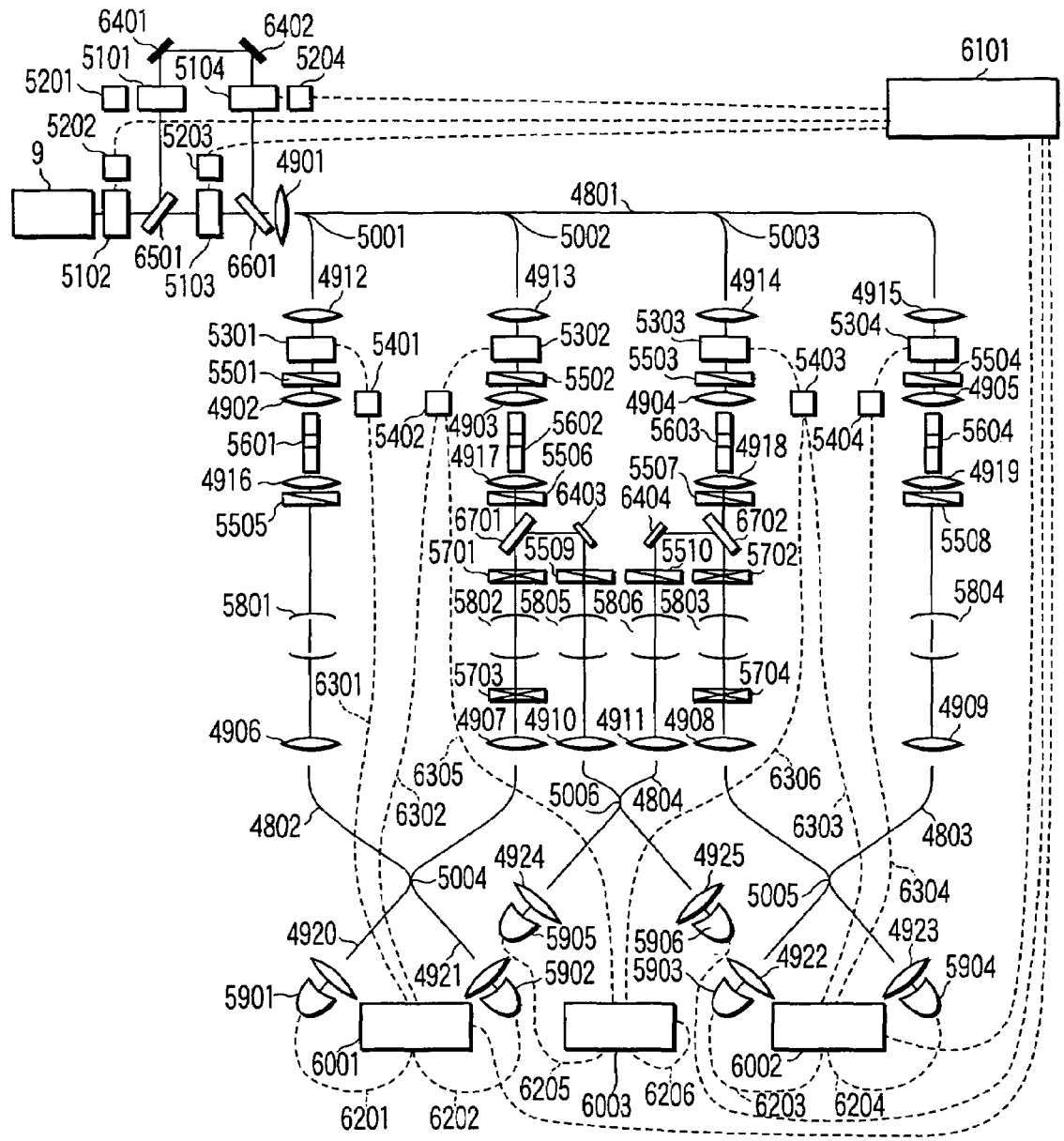
F I G. 14

US 7,406,173 B2

QUANTUM COMMUNICATION APPARATUS AND QUANTUM COMMUNICATION METHOD

CROSS-REFERENCE TO RELATED APPLICATIONS

This application is based upon and claims the benefit of priority from the prior Japanese Patent Application No. 2002-290107, filed Oct. 2, 2002, the entire contents of which are incorporated herein by reference.

BACKGROUND OF THE INVENTION

1. Field of the Invention

The present invention relates to an apparatus and a method of quickly generating entanglement between distant sites before occurrence of decoherence to enable quantum communication such as quantum teleportation or quantum cryptography between distant sites.

2. Description of the Related Art

In conventionally proposed quantum communication such as quantum teleportation or quantum cryptography, two light beams in an entanglement state (quantum mechanically entangled state) generated in one place are transmitted to both the sender and the receiver so as to perform communication by using a quantum correlation existing between the two light beams (A. Furusawa et al., Science, 282, 06, (1998); A. K. Ekert, Phys. Rev. Lett., 67(6), 661(1991)). However, since a quantum state cannot be duplicated, it cannot be amplified or relayed during transmission. Therefore, the communication distance is limited below the attenuation distance of light. In quantum cryptography using no entanglement (C. H. Bennett et al., Scientific American, October, (1992)) as well, the communication distance cannot be increased by general amplification and relaying. This incapability of increasing the communication distance raises a common problem in putting the quantum communication into practice.

Recently, L.-M. Duan et al. has proposed a method of entangling distant atomic gas ensembles by connecting them by light (L.-M. Duan et al., Nature, 414, 413(2001)).

In this method, two atomic ensembles (A and B) at distant sites are irradiated with laser light, and photons generated from the respective ensembles are detected by a special method, thereby entangling the ensembles A and B. Pairs of atomic ensembles entangled with each other are generated in this manner. Here, a pair of atomic ensembles is represented by A(u) and B(u) (where u=1, 2, 3, . . . ). Thereafter, light is applied to one atomic ensemble of each pair (e.g., B(1) and A(2) of pairs of A(1) and B(1) and A(2) and B(2)), and photons generated from each atomic ensemble are detected by a special method, thereby newly entangling the other atomic ensemble of each pair (i.e., A(1) and B(2)).

If entanglement connections generated between two such atomic ensembles are further connected to each other, there is a possibility that entanglement generation can be done over a distance longer than the attenuation distance of light. In addition, since the quantum state of an atomic ensemble is used instead of that of a single photon or atom, the communication is robust against noise.

In increasing the communication distance by connecting such entangled ensembles, the maximum distance of quantum communication is finally determined by how quickly connections in many stages can be made within a time during which the overall coherency is kept. Forming such a quantum communication means by using a solid material will provide an advantage in realizing an easy-to-handle, compact element. In this case, since a decoherence time of a solid material is generally short, it is indispensable to shorten a time for attaining entanglement connection.

Conventionally, however, there have been no known apparatus or method that can efficiently generate entanglement between distant sites by quickly irradiating necessary sites with light necessary for entanglement connection without using any time-consuming mechanical driver.

BRIEF SUMMARY OF THE INVENTION

It is an object of the present invention to provide an apparatus and method that can generate entanglement between distant sites by quickly and efficiently performing entanglement connection without using any mechanical driving operation requiring much operation time.

A quantum communication apparatus according to one aspect of the present invention, comprises:

n numbers of ensembles denoted as A(i) (i=1, 2, 3, . . . , n, n being $2^r$, where r is an integer of 2 or more), each ensemble comprising a plurality of physical systems, one of the plurality of physical systems having at least three energy levels of a first level, a second level and a third level viewed from the lower level, in which an angular frequency corresponding to an energy difference between the first and second levels is denoted as $\omega_{12}$, a physical system in a state of the first level capable of generating a first photon of an angular frequency $\omega_1 - \omega_{12}$ when irradiated with coherent pulsed light of an angular frequency $\omega_1$ and a physical system in a state of the first level capable of generating a second photon of an angular frequency $\omega_2 + \omega_{12}$ when irradiated with coherent pulsed light of an angular frequency $\omega_2$;

an optical system for the ensemble A(1), comprising: an optical shutter S1(1) disposed in an optical path for pulsed light to A(1); and an optical filter F1(1), disposed in an optical path for a photon generated from A(1), which selectively transmits the first photon;

an optical system for the ensemble A(n), comprising: an optical shutter S1(n) disposed in an optical path for pulsed light to A(n); and an optical filter F1(n), disposed in an optical path for a photon generated from A(n), which selectively transmits the first photon;

an optical system for the ensemble A(j) (j=2, 3, 4, . . . , n−1) comprising: an optical shutter S1(j) disposed in an optical path for pulsed light to A(j); a polarization beam splitter T(j), disposed in an optical path for a photon generated from A(j), which is set to a direction to transmit the first photon and the second photon; a polarizer P1(j), disposed in an optical path for the photon transmitted through the polarization beam splitter T(j), which transmits the first and second photons in which a polarization direction of the second photon is rotated; an optical filter F1(j), disposed in an optical path for the photon transmitted through the polarizer P1(j), which transmits the first photon and reflects the second photon; a polarizer P2(j), disposed in an optical path for the photon transmitted through the optical filter F1(j), which adjusts polarization of the first photon; and an optical filter F2(j), disposed in an optical path, branched from the polarization beam splitter T(j), for the photon reflected by the optical filter F1(j), re-transmitted through the polarizer P1(j), and reflected by the polarization beam splitter T(j) to the branched optical path, which selectively transmits the second photon;

a control circuit configured to selectively open optical shutters corresponding to a particular set of ensembles to be irradiated with pulsed light;

beam splitters B1(k) (k=1, 2, 3, . . . , n/2) configured to superpose the photon generated from the ensemble A(2×k−1) and transmitted through the optical filter F(2×k−1), and the photon generated from the ensemble A(2×k) and transmitted through the optical filter F(2×k);

pairs of photon detectors D1(2×k−1) and D1(2×k) detecting a photon output from the beam splitter B1(k) in two directions, respectively;

beam splitters B2(l) (l=1, 2, 3, . . . , (n/2)−1) configured to superpose the second photon generated from the ensemble A(2×l), transmitted through the polarization beam splitter T(2×l), transmitted through the polarizer P1(2×l), reflected by the optical filter F1(2×l), re-transmitted through the polarizer P1(2×l), reflected by the polarization beam splitter T(2×l) to a branched optical path and transmitted through the optical filter F1(2×l), the second photon generated from the ensemble A(2×l+1), transmitted through the polarization beam splitter T(2×l+1), transmitted through the polarizer P1(2×l+1), reflected by the optical filter F1(2×l+1), re-transmitted through the polarizer P1(2×l+1), reflected by the polarization beam splitter T(2×l+1) to a branched optical path and transmitted through the optical filter F1(2×l+1);

pairs of photon detectors D1(2×l) and D1(2×l+1) detecting a photon output from the beam splitter B2(1) in two directions, respectively; and signal processing circuits connected to the respective pairs of photon detectors and configured to generate signals to close the two optical shutters corresponding to the two ensembles participated in photon detection with either one of a particular pair of photon detectors.

A quantum communication method using the above apparatus according to another aspect of the present invention, comprises preparing the physical systems of the ensembles A(i) in the first level;

performing a first stage operation to generate entanglement between adjacent two ensembles A(2×k−1) and A(2×k), the first stage operation comprising: opening all the optical shutters S1(i) and irradiating all the ensembles A(i) with coherent pulsed light of the angular frequency $\omega_1$;

superposing, at the beam splitter B1(k), the first photon generated from the ensemble A(2×k−1) and transmitted through the optical filter F1(2×k−1), and the first photon generated from the ensemble A(2×k) and transmitted through the optical filter F1(2×k); and closing the optical shutters S1(2×k−1) and S1(2×k) when either one of the paired photon detectors D1(2×k−1) and D1(2×k) detects a photon output from the beam splitter B1(k) in the two directions such that all the optical shutters which have been opened are closed;

performing a second stage operation to generate entanglement between two ensembles on the both ends of a set of adjacent four ensembles, the second stage operation comprising:

opening the optical shutters S1(4×m−2) and S1(4×m−1) (m=1, 2, 3, . . . , n/4) and irradiating the ensembles A(4×m−2) and A(4×m−1) with coherent pulsed light of the angular frequency $\omega_2$;

superposing, at the beam splitter B2(2×m−1), the second photon generated from the ensemble A(4×m−2), transmitted through the polarization beam splitter T(4×m$^{-2}$), transmitted through the polarizer P1(4×m−2), reflected by the optical filter F1(4×m−2), re-transmitted through the polarizer P1(4×m−2), reflected by the polarization beam splitter T(4×m−2) to a branched optical path and transmitted through the optical filter F1(4×m−2), and the second photon generated from the ensemble A(4×m−1), transmitted through the polarization beam splitter T(4×m−1), transmitted through the polarizer P1(4×m−1), reflected by the optical filter F1(4×m−1), re-transmitted through the polarizer P1(4×m−1), reflected by the polarization beam splitter T(4×m−1) to a branched optical path and transmitted through the optical filter F1(4×m−1); and closing the optical shutters S1(4×m−2) and S1(4×m−1) when either one of the paired photon detectors D1(4×m−2) and D1(4×m−2) detects a photon output from the beam splitter B2(2×m−1) in the two directions such that all the optical shutters which have been opened are closed;

performing a q-th stage operation to generate entanglement between two ensembles on the both ends of a set of adjacent ensembles twice the previous stage, the q-th stage operation comprising:

opening the optical shutters S1($2^q \times m_q - 2^{q-1}$) and S1($2^q \times m_q - 2^{q-1} + 1$) ($m_q=1, 2, 3, \ldots, n/2^q$) and irradiating the ensembles A($2^q \times m_q - 2^{q-1}$) and A($2^q \times m_q - 2^{q-1} + 1$) with coherent pulsed light of the angular frequency $\omega_2$; and closing the optical shutters S1($2^q \times m_q - 2^{q-1}$) and S1($2^q \times m_q - 2^{q-1} + 1$) when either one of the paired photon detectors D2($2^q \times m_q - 2^{q-1}$) and D2($2^q \times m_q - 2^{q-1} + 1$) detects a photon such that all the optical shutters which have been opened are closed; and repeatedly performing later stage operations from a (q+1)-th stage to a r stage (r=$\log_2$n) corresponding to the q-th stage operation to generate entanglement between two ensembles A(1) and A(n) on the both ends of all the ensembles.

According to aspects of the present invention, a quantum communication apparatus and quantum communication method can be realized, which can generate entanglement between distant sites by quickly and efficiently performing entanglement connection without using any mechanical driving operation that requires much operation time.

BRIEF DESCRIPTION OF THE SEVERAL VIEWS OF THE DRAWING

FIG. 5 is a view showing an example of an apparatus for generating entanglement between physical system ensembles A(1) and A(4);

FIG. 6 is a conceptual view for explaining entanglement generated between physical system ensembles A(1) and A(n);

FIG. 14 is a view showing the schematic arrangement of the quantum communication apparatus according to Example 5.

DETAILED DESCRIPTION OF THE INVENTION

A theory on which a quantum communication method according to embodiments of the present invention is based will be described first.

L.-M. Duan et al. has proposed a promising method that may generate entanglement between physical system ensembles at two distant sites (L.-M. Duan et al., Nature, 414, 413(2001)). This method will be described below.

Figure 1:
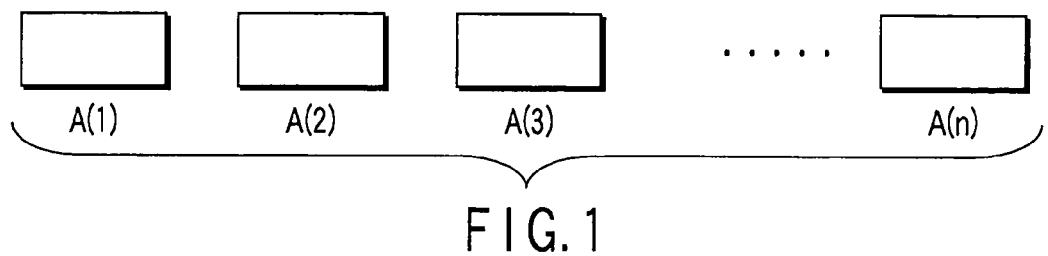
FIG. 1 is a view showing physical system ensembles A(i) arranged in a line in ascending order of i.

According to the method proposed by them, atomic gas ensembles are assumed as physical system ensembles having three states $|1\rangle$, $|2\rangle$, and $|3\rangle$ in ascending order of energy levels viewed from the ground state. Note that, in each atomic ensemble, optical transitions between $|1\rangle$ and $|\rangle$ and between $|2\rangle$ and $|\rangle$ are allowed, and an optical transition between $|1\rangle$ and $|2\rangle$ is substantially forbidden. Assume that n numbers of such atomic ensembles A(i) (i=1, 2, 3, ..., n) are prepared, and arranged in a line in ascending order of i, as shown in FIG. 1. The technique proposed by Duan et al. will be described below by exemplifying the case where entanglement is to be generated between A(1) and A(n).

Figure 2:
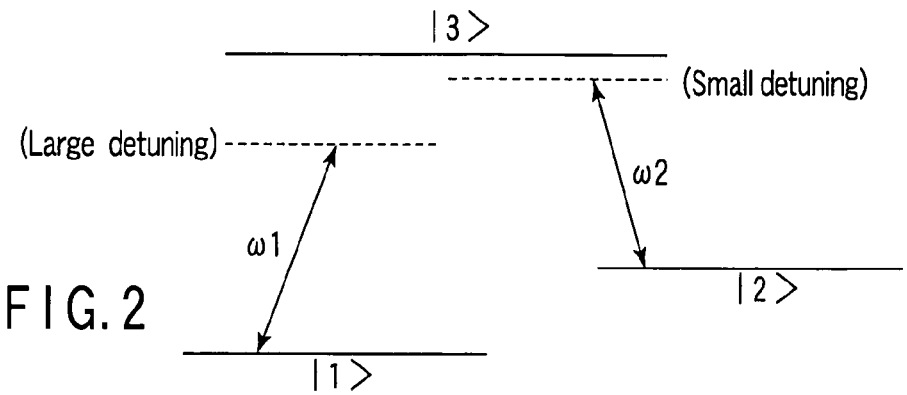
FIG. 2 is a view for explaining the relationship between the transition between a state |2> and a state |3>, the transition between a state |1> and the state |3>, and the angular frequency of light to be applied.

First, the physical systems contained in A(1) and A(2) are prepared in the state $|1\rangle$. As shown in FIG. 2, the physical systems is then irradiated with a laser beam with an angular frequency $\omega_1$ which has a large detuning $\Delta$ with respect to the $|1\rangle$-$|3\rangle$ transition. In this case, short-pulse light is used, by which the mean photon number in Stokes Raman scattered light accompanied by a Raman transition to level $|2\rangle$ and forward-scattered in the same direction as that of irradiated light becomes sufficiently smaller than 1. When one photon of Stokes Raman light generates, the state of atomic ensemble is represented by $S^\dagger|0_a\rangle$ where S is an operator representing excitation of a symmetrical collective mode and is represented by $$S \equiv 2N_a^{1/2} \Sigma_i |1\rangle_{ii}\langle 2|,$$

where $N_a$ is the number of atoms contained in the atomic ensemble. For the sake of simplicity, assume that all atomic ensembles are equal in $N_a$. In addition, $|0_a\rangle$ represents the ground state of an atomic ensemble and is given by $$|0_a\rangle \equiv \otimes_i |1\rangle_i.$$

In this case, an overall state $|\phi\rangle$ of the atomic ensemble including an emitted photon is given by $$|\phi\rangle = |0_a\rangle|0_p\rangle + p_c^{1/2} S^\dagger a^\dagger |0_a\rangle|0_p\rangle + o(p_c) \qquad (1),$$

where $|0_p\rangle$ is the vacuum state of the generated Stokes Raman scattered light mode, $a^\dagger$ is the annihilation operator of a photon generated in the mode, $p_c$ is the small excitation probability (the probability of occurrence of a photon), and $o(p_c)$ is the probability of occurrence of two or more photons, and takes a small value equal to or less than $p_c^2$.

Figure 3:
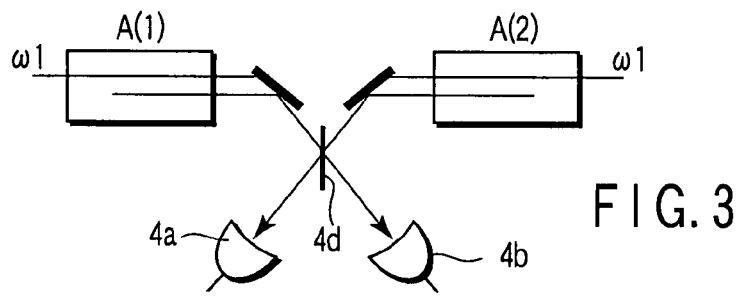
FIG. 3 is a view showing an example of an apparatus for generating entanglement between physical system ensembles A(1) and A (2)
Figure 4:
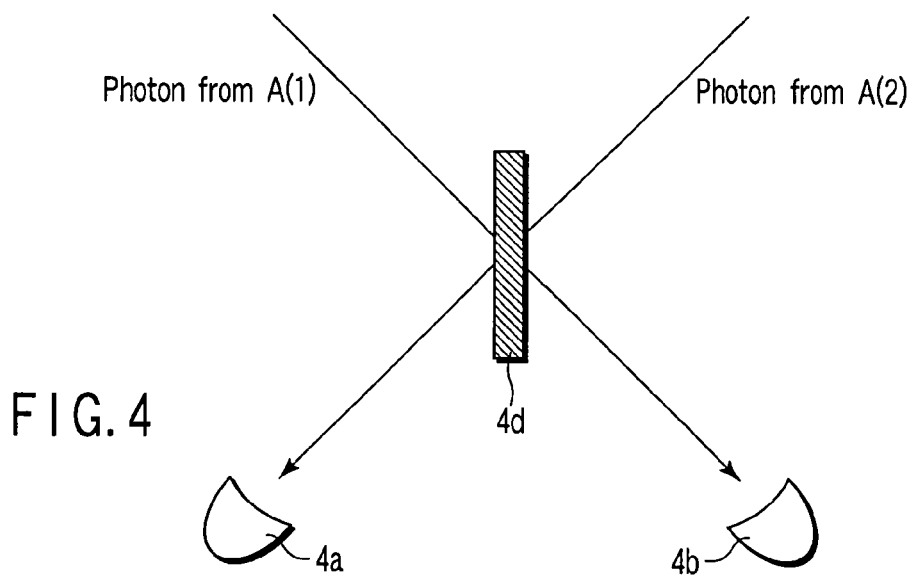
FIG. 4 is a view showing an example of an apparatus for generating entanglement between physical system ensembles A(1) and A(2)

FIGS. 3 and 4 are views showing an example of part of an apparatus for generating entanglement between A(1) and A(2). Optical paths are set such that, when photons are generated by simultaneously irradiating A(1) and A(2) with laser light having an angular frequency $\omega_1$, the photons reach a beam splitter 4d at the same time. The beam splitter 4d is installed such that the photons incident on the two sides are mixed with each other, and resultant photons are output in two directions.

The photon output from the beam splitter 4d is detected by photon detector 4a or 4b. The photon detected by the photon detector 4a is a photon mixed by the beam splitter 4d and output to the photon detector 4a. Letting a(1) be the annihilation operator of a photon generated by irradiating A(1) with a laser beam, and a(2) be the annihilation operator of a photon generated by irradiating A(2) with a laser beam, an annihilation operator $a_+$ of a photon propagating to the photon detector 4a is expressed by $$a_+ = 2^{-1/2}\{a(1) + e^{i\phi}a(2)\} \qquad (2),$$

where $\phi$ represents a difference of the phase shifts of photons from A(1) and from A(2).

When, therefore, a photon is detected with the photon detector 4a, a state after detection can be obtained by operating, to the state before photon detection, which is represented by equation (1), an operator $a_+$ representing that a photon propagating to the photon detector 4a is annihilated. That is, this state is represented by $$|\Psi_\phi\rangle_+ = a_+|\phi\rangle = 2^{-1/2}\{S(1)^\dagger + e^{i\phi}S(2)^\dagger\}|0_a(1)\rangle|0_a(2)\rangle \qquad (3),$$

where (1) and (2) of S(1), S(2), $|0_a(1)\rangle$ and $|0_a(2)\rangle$ represent that S and $|0_a\rangle$ correspond to A(1) and A(2), respectively.

Likewise, when a photon is detected with the photon detector 4b, the annihilation operator of a photon propagating to the photon detector 4b is expressed by $$a_- = 2^{-1/2}\{a(1) - e^{i\phi}a(2)\} \qquad (4).$$

When, therefore, a photon is detected with the photon detector 4b, a state after detection is represented by $$|\Psi_\phi\rangle_- = a_-|\phi\rangle = 2^{-1/2}\{S(1)^\dagger - e^{i\phi}S(2)^\dagger\}|0_a(1)\rangle|0_a(2)\rangle \qquad (5).$$

In states $|\Psi_\phi\rangle_+$ and $|\Psi_\phi\rangle_-$ represented by equations (3) and (5), entanglement is generated between $|0_a(1)\rangle$ and $|0_a(2)\rangle$, i.e., A(1) and A(2).

The following describes a case where a photon is detected with the photon detector 4a. A state represented by $|\Psi_\phi\rangle_+$ is expressed as follows in the presence of noise:

$$\rho(1,2)(c_0,\phi) = \{1/(c_0+1)\}(c_0|0_a(1)\rangle|0_a(2)\rangle\langle 0_a(2)|\langle 0_a(1)| + |\Psi_\phi\rangle_{++}\langle\Psi_\phi|) \qquad (6),$$

where $c_0$ is the value determined by dark count rates.

Entanglement is also generated between A(3) and A(4) in the same manner. The physical system constituted by A(1), A(2), A(3), and A(4) can be expressed by using equation (6) as follows:

$$\rho(1,2)(c_0,\phi_1) \otimes \rho(3,4)(c_0,\phi_2).$$

Subsequently, A(2) and A(3) are irradiated with laser light having an angular frequency $\omega_2$ (see FIG. 2) which is near resonant with the $|2\rangle$-$|3\rangle$ transition. As shown in FIG. 5, photons emitted from A(2) and A(3) by this light application are incident on the different surfaces of a beam splitter 5a to mix with each other. When a photon detector 5b or 5c detects a photon, a new entanglement is generated between A(1) and A(4). The new entanglement generation corresponds to transport of information about the quantum states of the atomic ensembles by photons and detection of an amount corresponding to $S_{\pm}^{\dagger}S_{\pm}$ through the photons. $S_{\pm}$ being expressed by the following equation (7), $$S_{\pm}=2^{-1/2}\{S(2)\pm S(3)\} \qquad (7).$$

In this case, the phase term of the entanglement between A(1) and A(4) is $\phi_1+\phi_2$.

Assume that there are $n=2^r$ numbers (r is an integer of 2 or more) of atomic ensembles A(i) (i=1, 2, 3, ..., n). In the first stage, entanglement is generated between A(2×k−1) and A(2×k) (where k=1, 2, 3, ..., n/2) in these atomic ensembles by the above method of irradiating the atomic ensembles with light having the angular frequency $\omega_1$. In the second stage, entanglement is generated between A(4×m−1) and A(4×m−1) (where m=1, 2, 3, ..., n/2) by the above method of irradiating the atomic ensembles with light having the angular frequency $\omega_2$. In the third and subsequent stages, the method of irradiating atomic ensembles with light having the angular frequency $\omega_2$ is repeated. In the q-th stage, entanglement can be generated between A($2^q \times (m_q-1)+1$) and A($2^q \times m_q$) (where $m_q=1, 2, 3, ..., n/2^q$).

Assuming, therefore, that the distance between A(2×k−1) and A(2×k) (k=1, 2, 3, ..., n/2) is represented by L, and A(2×l) is located near A(2×l+1), entanglement can be generated between atomic ensembles spaced apart from each other by $(2^{q-1})L$ after the q-th stage, as shown in FIG. 6.

In order to realize and develop the method proposed by Duan et al., each of the above operations must be done at high speed. There are, for example, following two reasons for this.

First, each of the above operations must be done before the coherency of atomic ensembles is lost. According to this method, in the respective stages, different combinations of atomic ensembles are irradiated with light, and the resultant photons must be combined at the beam splitter. In addition, a photon generated upon irradiation of each atomic ensemble with light needs to be separated from irradiated light or unnecessary scattered light transmitted through the atomic ensemble. Furthermore, the angular frequency (wavelength) of a photon to be separated differs in the first and second stages. No entanglement can be generated between two spatially separated physical systems unless these operations are done within a time during which the coherency of the atomic ensembles is kept, i.e., a decoherence time. In other words, the distance over which quantum communication can be performed depends on how much the above operation can be done within the decoherence time.

In general, the decoherence time of nuclear spins of an atomic gas is as long as about 1 ms, although it is expected long. The decoherence time of a solid material, which is suitable for fabrication of a device, is believed shorter even when it is cooled to the liquid He temperature. Therefore, speeding of each of the above operations is a matter of problem in implementing an apparatus.

Second, the amount of information transmitted per unit time is determined by how quickly entanglement can be generated. More specifically, in information communication using entanglement, the entanglement is generated between the sender and the receiver, and information is sent by using the resultant quantum correlation. However, the amount of information that can be transmitted per entanglement generation is limited (about 1 bit). From the viewpoint of information communication, therefore, the number of times of entanglement generation becomes a serious problem in putting quantum communication into practice as well as entanglement generation.

The quantum communication apparatus and method according to embodiments of the present invention can solve these problems. The embodiments of the present invention permit to realize multistage entanglement connection according to Duan et al. without exchange or rearrangement of optical systems, or mechanically operating elements. More specifically, the embodiments of the present invention can be constructed using only passive elements without any actuating parts, active devices having no mechanically actuating parts, such as an electro-optical device capable of ultrahigh-speed operation, and a laser source capable of generating high-speed pulse trains or a continuous wave laser source. The embodiments will be described in detail below with reference to the several views of the accompanying drawing.

In the embodiments, consider physical system ensembles having three states |1>, |2>, and |3> in ascending order of energy levels viewed from the ground state. Note that, in each ensemble, the |1>-|3> and |2>-|3> optical transitions are allowed, but the |1>-|2> optical transition is substantially forbidden. Assume that n numbers of such ensembles A(i) (i=1, 2, 3, ..., n) are prepared, and arranged in ascending order of i, as shown in FIG. 1. The quantum communication method according to the embodiments will be described below by exemplifying the case where entanglement is to be generated between A(1) and A(n).

Figure 7:
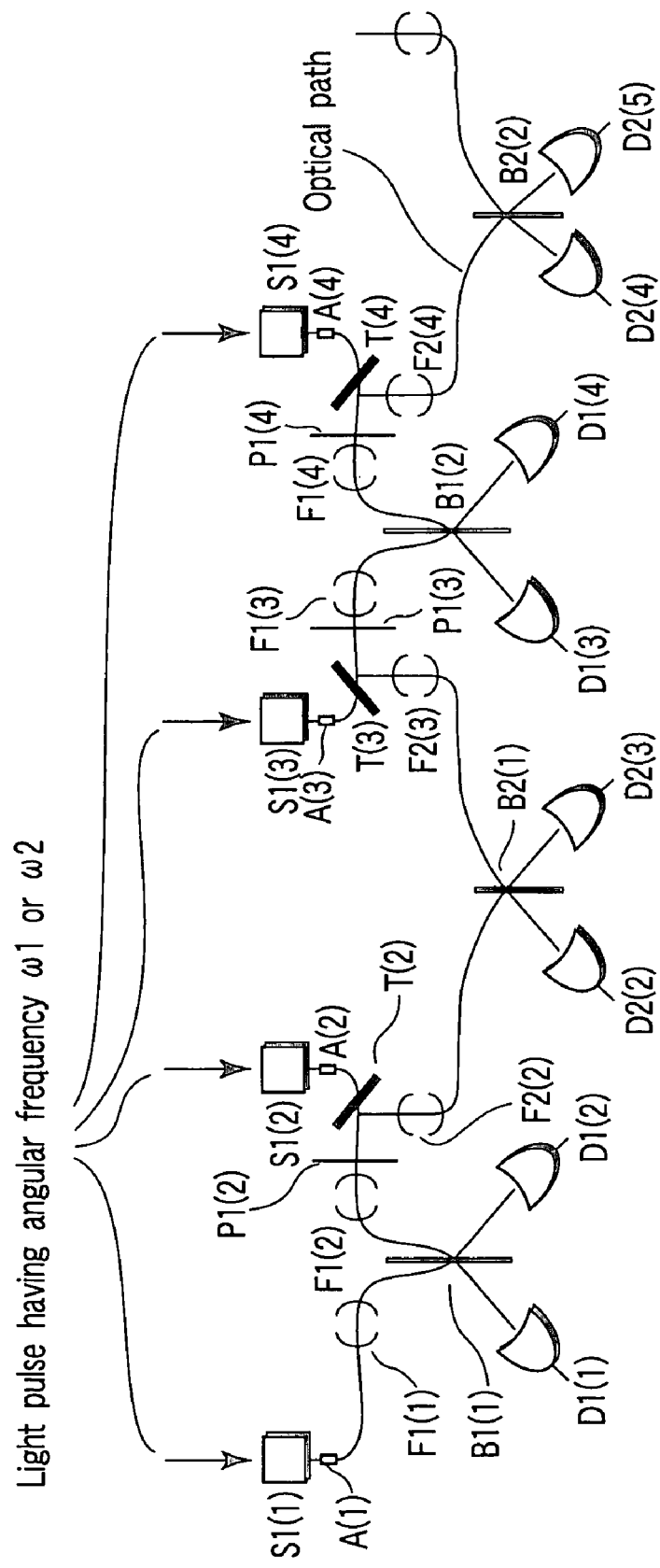
FIG. 7 is a view showing the schematic arrangement of a quantum communication apparatus according to an embodiment.

FIG. 7 is a view for explaining the schematic arrangements of the quantum communication apparatus according to an embodiment of the present invention.

There are prepared n numbers of physical system ensembles A(i), where $n=2^r$ (r is an integer of 2 or more). Each physical system ensemble A(i) is an atomic ensemble constituted by gas molecules in a cell, ions dispersed in a crystal, ions and atoms dispersed in an optical fiber, a gas or solid material held near an optical waveguide and interacts with an evanescent field of light which propagates in the optical waveguide, a liquid material, and the like. The physical system ensemble A(i) may take any form as long as it is a system capable of interacting with light.

The optical shutters S1(i) (where i is an integer of 1 to n) are provided for the physical system ensembles A(i), respectively. Each optical shutters S1(i) is constituted by an electro-optical device, an acousto-optical device and the like capable of high-speed response. When a particular optical shutter S1(i) is opened, the physical system ensemble A(i) corresponding the optical shutter is irradiated with a light pulse train having an angular frequency $\omega_1$ or $\omega_2$.

The optical filters F1(i) (F1(1) to F1(4) in FIG. 7) for selecting an angular frequency used in the first stage are installed on optical paths that forward-scattered Stokes light propagates, in order to discriminate the forward-scattered Stokes light from the atomic ensembles A(i) from the light of the angular frequency $\omega_1$ and other unnecessary scattered light which are transmitted through the atomic ensembles A(i). The optical filters F1(i) have characteristics of selectively transmitting a photon of the angular frequency $\omega_1-\omega_{12}$ but reflecting a photon of the angular frequency $\omega_2+\omega_{12}$ generated when a physical system is irradiated with light of the angular frequency $\omega_2$ in the second and subsequent stages described hereinafter. As the angular frequency selection filter F1(i), interference filter, optical resonators, and the like can be used.

The beam splitters B1(k) (where k=1, 2, 3, ..., n/2) (FIG. 7 shows the beam splitters B1(1) and B1(2)) mix photons simultaneously incident on the both surfaces and may emit photons in two directions to photon detectors D1(2k−1) and D1(2k).

The photon detectors D1(i) (FIG. 7 shows the photon detectors D1(1) to D1(4)) detect a photon emitted from the beam splitters B1(k) after the mixing of photons.

The polarization beam splitters T(j) (FIG. 7 shows the polarization beam splitters T(2), T(3), and T(4)) are inserted between the atomic ensembles A(j) and the optical filters F1(j). The polarization beam splitter T(j) is installed in a direction to transmit photons having angular frequencies $\omega_1-\omega_{12}$ and $\omega_2+\omega_{12}$ which are generated from A(j). In other words, each of light of the angular frequency $\omega_1$ and light of the angular frequency $\omega_2$ is applied as polarized light which permits each of photons having angular frequencies $\omega_1-\omega_{12}$ and $\omega_2+\omega_{12}$ generated from the atomic ensembles A(j) to be transmitted through T(j).

The polarizers P1(j) are installed on optical paths of photons transmitted through the polarization beam splitters T(j). The polarizer P1(j) transmits the photons having angular frequencies $\omega_1-\omega_{12}$ and $\omega_2+\omega_{12}$, during which an polarization direction of the photon of the angular frequency $\omega_2+\omega_{12}$ is rotated.

The photon of the angular frequency $\omega_1-\omega_{12}$, transmitted through the polarization beam splitter T(j), is transmitted through the optical filter F1(j) and is incident on the beam splitter B1(k).

On the other hand, the photon of the angular frequency $\omega_2+\omega_{12}$, transmitted through the polarization beam splitter T(j), is effected for the polarization direction to be rotated in transmitting the polarizer P1(j), is reflected by the optical filter F1(j), is effected for the polarization direction to be rotated in re-transmitting the polarizer P1(j), and is reflected to a branched optical path other than the optical paths described previously.

The optical filters F2(j) for selecting an angular frequency used in the second and subsequence stages are installed on the branched optical paths. The optical filter F2(j) has characteristics to selectively transmit a photon of the angular frequency $\omega_2+\omega_{12}$. The photon of the angular frequency $\omega_2+\omega_{12}$, transmitted through the optical filter F2(j) is incident on the beam splitter B1(k).

The beam splitters B2(l) (where l=1, 2, 3, . . . , (n/2)−1) (FIG. 7 shows B2(1) and B2(2)) mix photons of the angular frequency $\omega_2+\omega_{12}$ which are simultaneously incident on the both surfaces and may emit photons in two directions to photon detectors D1(2l) and D1(2l+1). The incidence timing of photons of the angular frequency $\omega_2+\omega_{12}$ on the both surfaces of the beam splitter B2(l) is adjusted by the application timing of a light pulse train of the angular frequency $\omega_2$ and the optical path length to the beam splitter B2(l).

The operation of the quantum communication apparatus will be described. First, the states of atoms in various energy levels in the respective atomic ensembles A(i) are caused to transition to the state |1> by cooling or application of predetermined light.

After the respective atoms are transited to the state |1>, the first stage operation is performed to generate entanglement between the atomic ensembles A(2×k−1) and A(2×k). Each atomic ensemble A(i) is irradiated with a light pulse train with the angular frequency $\omega_1$ through the high-speed optical shutter S1(i). This application of light can be realized at high speed by, for example, using a method of incessantly sending the pulse train with $\omega_1$ onto the high-speed optical shutter S1(i) and controlling application of light by opening/closing the high-speed optical shutter S1(i). If there is a sufficient control time margin, application of the light pulse train may be controlled by ON/OFF-controlling a laser source (not shown). In the latter case, the high-speed optical shutter S1(i) is incorporated in the light source itself.

This application of light is executed at the timing at which when photons generated from adjacent ensembles (the ensembles A(1) and A(2) and the ensembles A(3) and A(4) in FIG. 7) are to be superposed at the respective beam splitters (B1(1) and B1(2) in FIG. 7) and then detected, the photons generated from the respective atomic ensembles simultaneously reach the respective beam splitters. In addition, the pulse width of this light pulse train with the angular frequency $\omega_1$ is adjusted such that the mean number of photons generated from the respective atomic ensembles by one pulse application becomes sufficiently smaller than 1. In order to enhance the connection between the mode of a photon and an atomic ensemble, each ensemble A(i) may be placed in a resonator.

When each atomic ensemble A(i) is irradiated with the light pulse having the angular frequency $\omega_1$, forward-scattered Stokes light (scattered light shifted to the long wavelength, which is generated in the same direction as that of the applied light pulse) is generated by a Raman transition. This forward-scattered Stokes light has the angular frequency $\omega_1-\omega_{12}$, where $\omega_{12}$ is a transition angular frequency between the state |1> and the state |2> (likewise, $\omega_{13}$ is defined as a transition angular frequency between the state |1> and the state |3>; and $\omega_{23}$, a transition angular frequency between the state |2> and the state |3>).

The light containing the forward-scattered Stokes light generated from A(j) (j=2, 3, . . . , n−1) is incident on the polarization beam splitter T(j). The polarization beam splitter T(j) is installed in a direction corresponding to the polarization of light with the angular frequency $\omega_1-\omega_{12}$ and light with the angular frequency $\omega_2+\omega_{12}$. The polarization beam splitter T(j) therefore transmits the photon with the angular frequency $\omega_1-\omega_{12}$ and the photon with the angular frequency $\omega_2+\omega_{12}$.

The photon transmitted through the polarization beam splitter T(j) passes through the polarizer P1(j) and incident on the optical filter F1(j). The optical filter F1(j) discriminates the forward-scattered Stokes light from the light with the angular frequency $\omega_1$ which is transmitted through the atomic ensemble A(j) and other unnecessary scattered light. As a result, only the photon with the angular frequency $\omega_1-\omega_{12}$ is incident on the polarization beam splitter B1(k).

A photon having the angular frequency $\omega_1-\omega_{12}$ generated from A(1) or A(n) is separated by F1(1) or F1(n), and then incident on the beam splitter B1(1) or B1(n).

The beam splitter B1(k) mixes the photons having the angular frequency $\omega_1-\omega_{12}$ simultaneously incident on the both surfaces, and may emit photons in two directions to photon detectors D1(2×k−1) and D1(2×k) The incidence timing of the photons having angular frequency $\omega_1-\omega_{12}$ on the both surfaces of the beam splitter B1(k) can be adjusted by the application timing of the light pulse train with the angular frequency $\omega_1$ and the optical path length to the beam splitter B1(k).

When either one of the photon detector D12×k−1) and the photon detector D1(2×k) detects the photon from the beam splitter B1(k), the high-speed optical shutters S1(2×k−1) and S1(2×k) are quickly closed in synchronism with the detection. The closing of the optical shutters which is synchronous with this photon detection is automatically performed by a signal processing circuit connected to the high-speed optical shutters S1(2×k−1) and S1(2×k) and the photon detectors D1(2×k−1) and D1(2×k). Closing the optical shutters S1(2×k−1) and S1(2×k) inhibits a light pulse from being applied to A(2×k−1) and A(2×k) participated in the photon detection.

When detection of a photon by either of the photon detectors D1(2×k−1) and (D1(2×k) and closing of the optical shutters S1(2×k−1) and S1(2×k) are completed for all the combinations of k=1, 2, . . . , n/2, entanglement connections can be generated between all the adjacent ensembles A(2×k−1) and A(2×k)

From the viewpoint of efficiently performing entanglement generation in the first stage, irradiation of all the adjacent ensembles A(2×k−1) and A(2×k) with light, photon detection by the photon detectors D1(2×k−1) and D1(2×k), and closing of the high-speed optical shutters S1(2×k−1) and S1(2×k) are preferably performed in parallel with respect to all the combinations of k=1, 2, . . . , n/2.

Subsequently, the second operation is performed to generate entanglement between the atomic ensembles A(4×m−3) and A(4×m). First, the respective atomic ensembles A(4×m−2) and A(4×m−1) are irradiated with a light pulse train having the angular frequency $\omega_2$ through the high-speed optical shutters S1(4×m−2) and S1(4×m−1).

When the atomic ensemble A(4×m−2) or A(4×m−1) is irradiated with a light pulse having the angular frequency $\omega_2$, a photon with the angular frequency $\omega_2+\omega_{12}$ is generated due to a Raman transition.

The light containing the photon with the angular frequency $\omega_2+\omega_{12}$ is incident on the polarization beam splitter T(4×m−2) or T(4×m−1). The polarization beam splitter T(4×m$^{-2}$) or T(4×m−1) transmits a photon having central angular frequency $\omega_2+\omega_{12}$.

The light transmitted through the polarization beam splitter T(4×m−2) or T(4×m−1) is incident on the polarizer P1(4×m−2) or P1(4×m−1) installed on the subsequent optical path. The polarization direction of the photon with the angular frequency $\omega_2+\omega_{12}$ generated from the atomic ensemble A(4×m−2) or A(4×m−1) and incident on the polarization beam splitter T(4×m−2) or T(4×m−1) is set such that the photon is rendered p-polarized light so as to be transmitted through the polarization beam splitter T(4×m−2) or T(4×m−1).

The photon with the angular frequency $\omega_2+\omega_{12}$ transmitted through the polarization beam splitter T(4×m−2) or T(4×m−1) is effected by the polarizer P1(i) in the process of propagating to the optical filter F1(4×m−2) or F1(4×m−1) and in the process of being reflected by the optical filter F1(4×m−2) or F1(4×m−1) and returning to the polarization beam splitter T(4×m−2) or T(4×m−1). On the whole, when the photon with angular frequency $\omega_2+\omega_{12}$ propagates from the polarizer P1(4×m−2) or P1(4×m−1) to the polarization beam splitter T(4×m−2) or T(4×m−1), the photon is so polarized as to be reflected by the polarization beam splitter T(4×m−2) or T(4×m−1).

As the polarizers P1(4×m−2) and P1(4×m−1), a λ/4 plate can be used. In this case, the direction of the optical axis of the λ/4 plate is set at 45° with respect to the direction of polarized light transmitted through the polarization beam splitter T(4×m−2) or T(4×m−1). The polarized light with the angular frequency $\omega_2+\omega_{12}$, transmitted through the polarization beam splitter T(4×m−2) or T(4×m−1), is transmitted through the polarizer P1(4×m−2) or P1(4×m−1), reflected by the optical filter F1(4×m−2) or F1(4×m−1), and re-transmitted through the polarizer P1(4×m−2) or P1(4×m−1). As a result, the polarization direction of the polarized light is rotated at 90°.

The photon transmitted trough the polarizer P1(4×m−2) or P1(4×m−1) and incident on the polarization beam splitter T(4×m−2) or T(4×m−1) is rendered to be s-polarized light with respect to the polarization beam splitter T(4×m−2) or T(4×m−1). The photon is therefore reflected by the polarization beam splitter T(4×m−2) or T(4×m−1) to the branched optical path other than the optical paths previously described. The photon reflected by the polarization beam splitter T(4×m−2) or T(4×m−1) is incident on the optical filter F2(4×m−2) or F1(4×m−1). The optical filter F2(4×m−2) or F1(4×m−1) filters off unnecessary light such as light with the angular frequency $\omega_2$ and transmits only the photon with the angular frequency $\omega_2+\omega_{12}$.

This arrangement allows only a photon with the angular frequency $\omega_1-\omega_{12}$ which is generated when the atomic ensemble A(i) is irradiated with a light pulse with the angular frequency $\omega_1$ to propagate from the optical filter F1(i) onward when viewed from the atomic ensemble A(i). In addition, the arrangement allows only a photon with the angular frequency $\omega_2+\omega_{12}$ which is generated when the atomic ensemble A(j) is irradiated with a light pulse with the angular frequency $\omega_2$ to propagate from the optical filter F2(j) onward when viewed from the atomic ensemble A(j).

The beam splitter B2(2×m−1) mixes the photons having the angular frequency $\omega_2+\omega_{12}$ which are simultaneously incident on the both surfaces, and may emit photons in two directions to photon detectors D1(4×m−2) and D1(4×m−1). The incidence timing of the photons with the angular frequency $\omega_1+\omega_{12}$ on the both surfaces can be adjusted by the application timing of a light pulse train with the angular frequency $\omega_2$ and the optical path length to the beam splitters B2(2×m−1)

When either one of the photon detector D2(4×m−2) and the photon detector D2(4×m−1) detects a photon from the beam splitter B2(2×m−1), the high-speed optical shutters S1(4×m−2) and S1(4×m−1) quickly closed in synchronism with the detection. When photon detection by either one of the photon detectors D2(4×m$^{-2}$) and D2(4×m−1) and closing of the high-speed optical shutters S1(4×m−2) and S1(4×m−1) are completed with respect to all the combinations of m=1, 2, . . . , n/4, entanglement can be generated between A(4×m−3) and A(4×m).

From the viewpoint of efficiently performing entanglement generation in the second stage, irradiation of all the ensembles A(4×m−2) and A(4×m−1) with light, photon detection by D2(4×m−2) and D2(4×m−1), and closing of the high-speed optical shutters S1(4×m−2) and S1(4×m−1) are preferably performed in parallel with respect to all the combinations of m=1, 2, . . . , n/4.

In the third and subsequent stages, the same operations as those in the second stage are repeated. Therefore, the following describes with respect to a generalized q-th stage. The high-speed optical shutters $S1(2^q \times m_q - 2^{q-1})$ and $S1(2^q \times m_q - 2^{q-1}+1)$ are opened, and atomic ensembles $A(2^q \times m_q - 2^{q-1})$ and $A(2^q \times m_q - 2^{q-1}+1)$ are irradiated with the light pulse train having the angular frequency $\omega_2$, (where $m_q$=1, 2, 3, . . . , $n/2^q$). When either one of the photon detectors $D2(2^q \times m_q - 2^{q-1})$ and $D2(2^q \times m_q - 2^{q-1}+1)$ detects a photon, the high-speed optical shutters $S1(2^q \times m_q - 2^{q-1})$ and $S1(2^q \times m_q - 2^{q-1}+1)$ are quickly closed in synchronism with the photon detection. This inhibits a light pulse from being applied to the atomic ensembles $A(2^q \times m_q - 2^{q-1})$ and $A(2^q \times m_q - 2^{q-1}+1)$ participated in the photon detection. As a consequence, entanglement is generated between $A(2^q \times (m_q-1)+1)$ and $A(2^q \times m_q)$. When photon detection by the set of the photon detectors $D2(2^q \times m_q - 2^{q-1})$ and $D2(2^q \times m_q - 2^{q-1}+1)$ and closing of the high-speed optical shutters $S1(2^q \times m_q - 2^{q-1})$ and $S1(2^q \times m_q - 2^{q-1}+1)$ are completed with respect to all the combinations of $m_q$=1, 2, 3, . . . , $n/2^q$, entanglement can be generated between all the combinations of $A(2^q \times (m_q-1)+1)$ and $A(2^q \times m_q)$ with respect to $m_q$=1, 2, 3, . . . , $n/2^q$. These operations are executed to an r-th stage ($r=\log_2 n$) to generate entanglement between A(1) and A(n).

According to the above arrangement, the following effects can be obtained. First, in the embodiments of the present invention, entanglement can be generated between spatially separated physical ensembles by only opening/closing high-speed optical shutters in synchronism with photon detection by a photon detector. More specifically, the method can be executed by using only passive elements without any actuating parts, active devices having no mechanically actuating parts, such as an electro-optical device capable of ultrahigh-speed operation, and a laser source capable of generating high-speed pulse trains or a continuous wave laser source. Therefore, multistage entanglement connection can be realized within the decoherence time of physical system ensembles. As a consequence, an apparatus and method that can generate entanglement between spatially separated physical ensembles can be provided.

Assume that the atomic ensembles A(i) are arranged in a line, the distance between A(2×k−1) and A(2×k) is represented by L, and A(2×k) and A(2×k+1) are adjacent to each other, and that entanglement connections are repeated up to the r-th stage. In this case, entanglement can be generated between atomic ensembles spaced apart from each other by $(2^{r-1}) \times L$. This makes it possible to realize quantum communication such as quantum cryptography or quantum teleportation over this distance by using entanglement.

Even if entanglement generation fails halfway, the operation of generating entanglement can be quickly executed again by only opening/closing high-speed optical shutters.

In the embodiments of the present invention, two light sources may be provided as the light source for emitting a light pulse train of the angular frequency $\omega_1$ used in the first stage and the light source for emitting a light pulse train of the angular frequency $\omega_2$ used in the second and subsequent stages.

On the other hand, in another embodiment of the present invention, an angular frequency $\omega_3$ which is near resonant with the |2>-|3> transition may be used for both the angular frequency $\omega_1$ in the first stage and the angular frequency $\omega_2$ in the second and subsequent stages. This allows the use of one type of laser as a light source for irradiating the respective physical system ensembles with a coherence light pulse trains. In this case, the respective laser source may keep emitting a light pulse trains, and entanglement connections can be sequentially generated by only opening/closing shutters in synchronism with photon detection by a detector. Therefore, a quantum communication apparatus can be implemented relatively easily at low cost.

Figure 8:
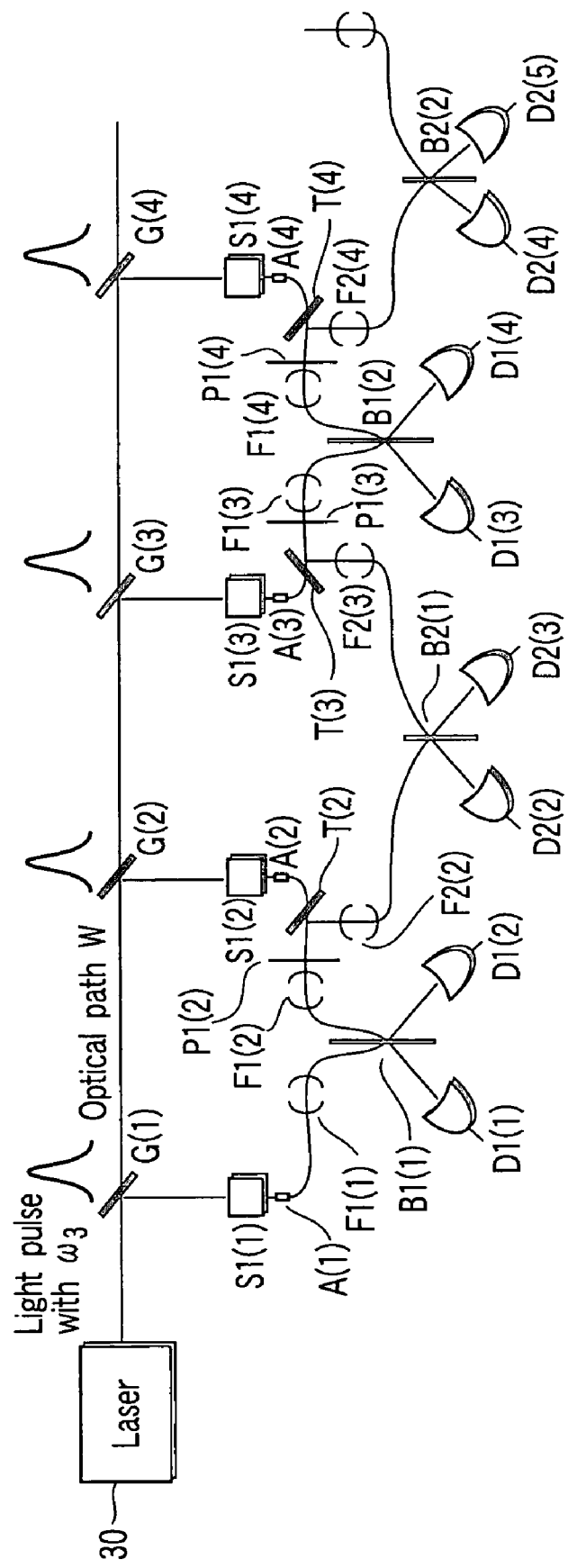
FIG. 8 is a view showing the schematic arrangement of a quantum communication apparatus according to another embodiment.

FIG. 8 is a view for explaining the schematic arrangement of a quantum communication apparatus according to the second embodiment. As shown in FIG. 8, the quantum communication apparatus includes physical system ensembles A(i) (where i is an integer from 1 to n). In addition, the apparatus includes the laser source 30 as a signal light source, the optical path W, and the beam splitters G(i) (where i is an integer from 1 to n).

The laser source 30 generates only a light pulse train having an angular frequency $\omega_3$ near resonant with the |2>-|3> transition. Assume that the angular frequency $\omega_3$ has large detuning with respect to the |1>-|3> transition.

The beam splitter G(i) is placed near each ensemble A(i) on the optical path W, and splits an applied light pulse from the laser source 30. As the beam splitter G(i), a device using reflection and transmission of light by quartz plates, an optical coupler obtained by placing optical fibers close to each other or twisting them together, or the like can be used.

The optical path W is, for example, an arrangement having an optical system constituted by mirrors, prisms, and the like to make light propagate in a free space, an optical waveguide or an optical fiber formed of an optical medium such as quartz. Note that the optical path may include a lens for properly converging or shaping light and a polarizer for adjusting a polarization direction of light.

The operation of this quantum communication apparatus will be described. First, the laser source 30 generates a light pulse train with the angular frequency $\omega_3$. The light pulse train with the angular frequency $\omega_3$ propagates through the optical path W placed along the physical system ensembles A(1) to A(n) arranged in a line. The light pulse train propagating through the optical path W is split by the beam splitters G(i) for splitting irradiation light which are arranged near the respective ensembles A(i). The split light pulse trains are incident on high-speed optical shutters S1(i) arranged before the respective atomic ensembles A(i). In this manner, light pulse trains are always incident on the high-speed optical shutters S1(i) corresponding to the respective atomic ensembles A(i).

In this case, the intervals of light pulse trains are set in accordance with the optical path lengths such that when the high-speed optical shutters S1(2×k−1) and S1(2×k) are opened to irradiate the atomic ensembles A(2×k−1) and A(2×k) with light in the first stage of entanglement generation, photons with an angular frequency $\omega_3 - \omega_{12}$ which are generated from the atomic ensembles A(2×k−1) and A(2×k) simultaneously reach the beam splitter B1(k). In addition, the intervals of light pulse trains and optical path lengths are set such that when the high-speed optical shutters S1(2×h) and S1(2×h+1) are opened to irradiate the atomic ensembles A(2×h) and A(2×h+1) with light in the second or subsequent stage, photons with an angular frequency $\omega_3 + \omega_{12}$ which are generated from the atomic ensembles A(2×h) and A(2×h+1) simultaneously reach the beam splitter B2(h). Where k=1, 2, 3, . . . , n/2, and h=1, 2, 3, . . . , n/2−1.

Assume that all the high-speed optical shutters S1(i) are closed. In this condition, when the high-speed optical shutters S1(i) are opened in the first stage with respect to the atomic ensembles A(i) prepared such that the energy levels of atoms are set to |1>, and photon detectors D1(i) detect photons, the high-speed optical shutters S1(i) are closed, as described in the first embodiment. For entanglement connection in the second stage, shutters for irradiating particular physical systems with a light pulse train are selectively opened. In this case, there is no need to switch irradiation wavelengths, and it is only required to keep sending light pulse trains from the laser source 30 to the optical path W in the first stage and the second and subsequent stages as well.

That is, by executing photon detection by photon detectors and closing of shutters in synchronism with the detection in multiple stages without mechanical actuation or angular frequency (wavelength) switching, entanglement can be generated between distant sites, as in the first embodiment using light beams having different angular frequencies in the first and second stages.

Examples of this quantum communication apparatus and quantum communication method according to the present invention will be described bellow. In each Example to be described below, for the sake of a concrete explanation, descriptions are made with reference to FIGS. 9 to 15 for the cases where there are four atomic ensembles A(1) to A(4), and entanglement is to be generated between A(1) and A(4).

Figure 9:
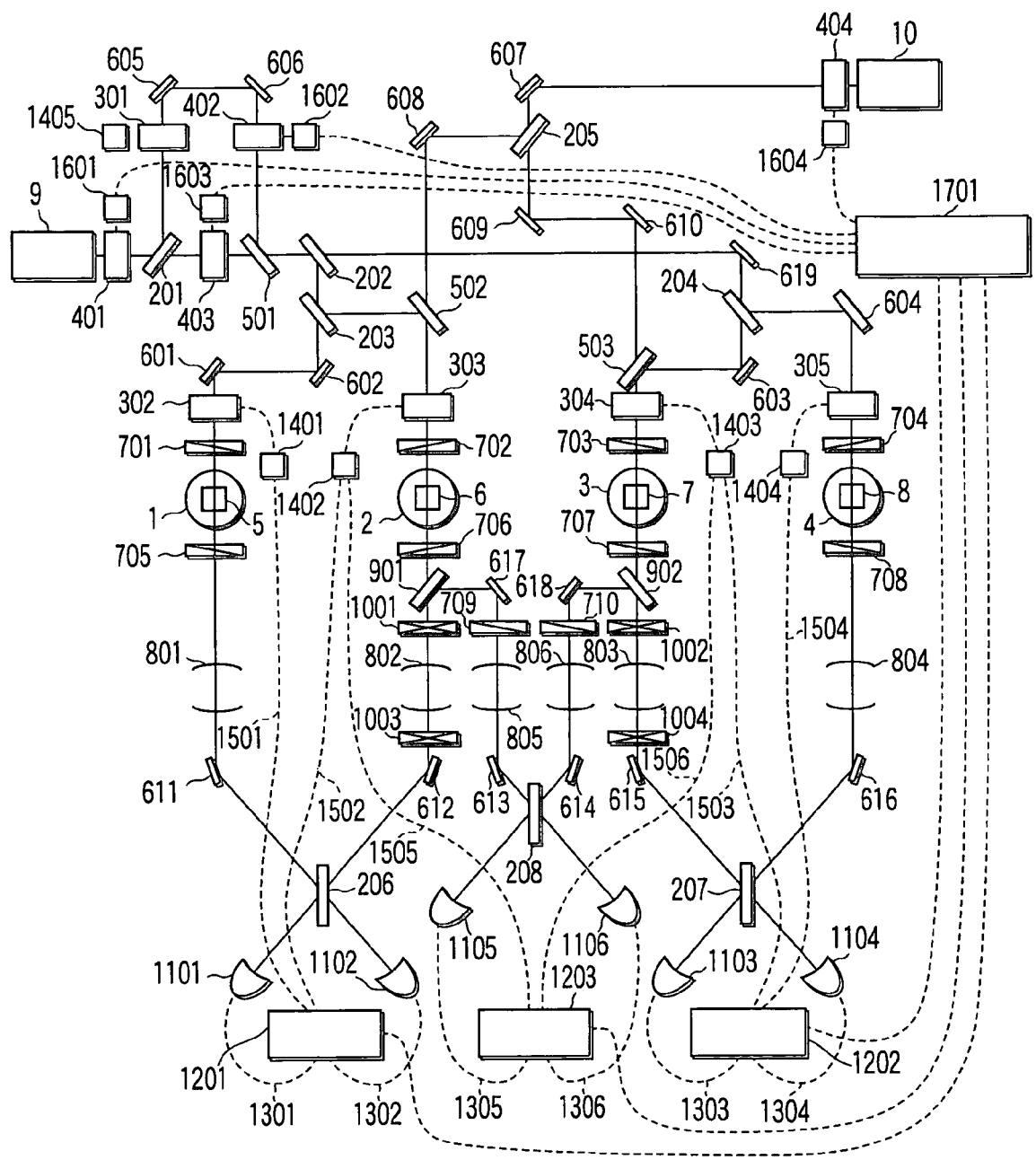
FIG. 9 is a view showing the schematic arrangement of the quantum communication apparatus according to Example 1.
Figure 11:
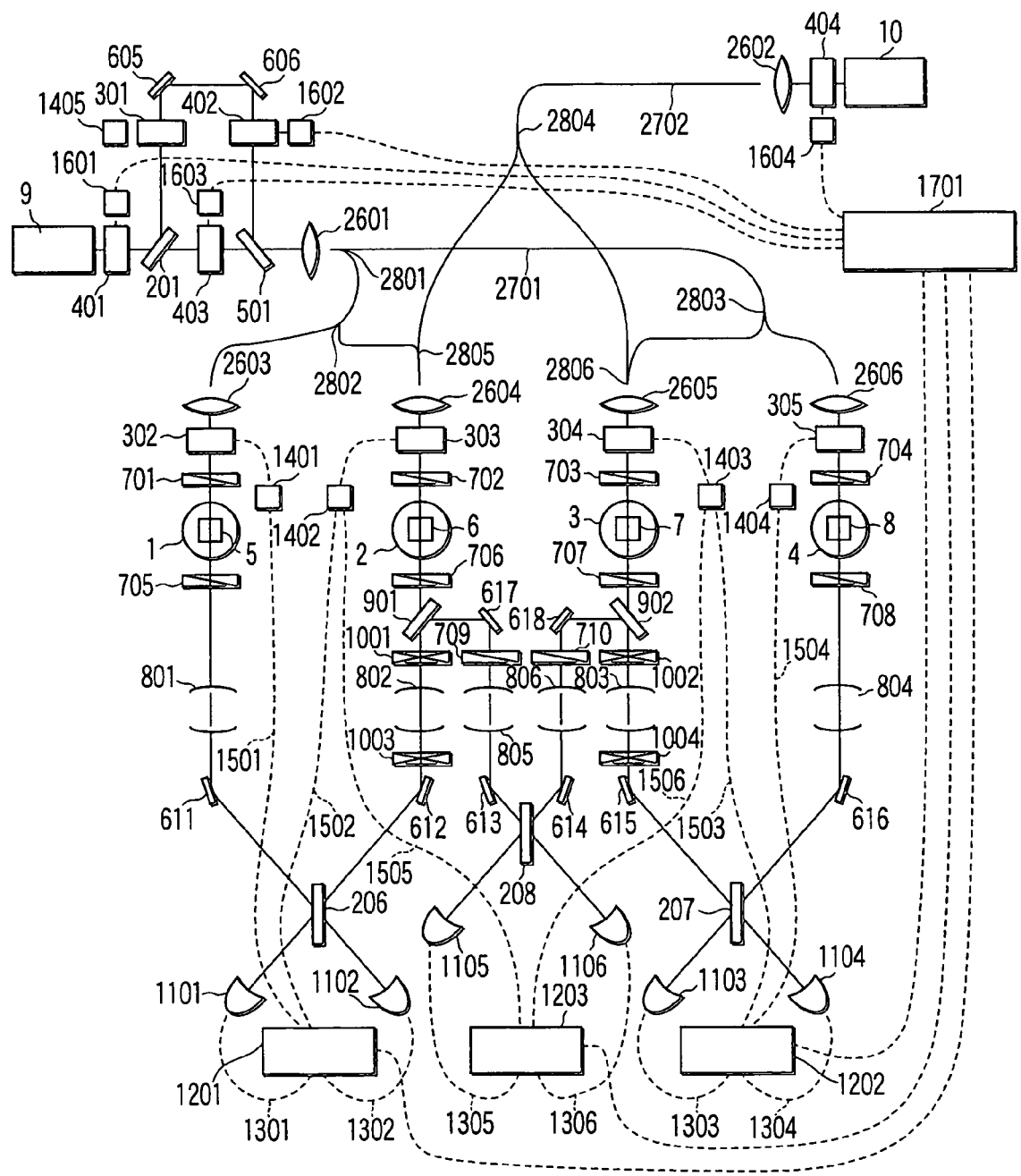
FIG. 11 is a view showing the schematic arrangement of the quantum communication apparatus according to Example 2.
Figure 13:
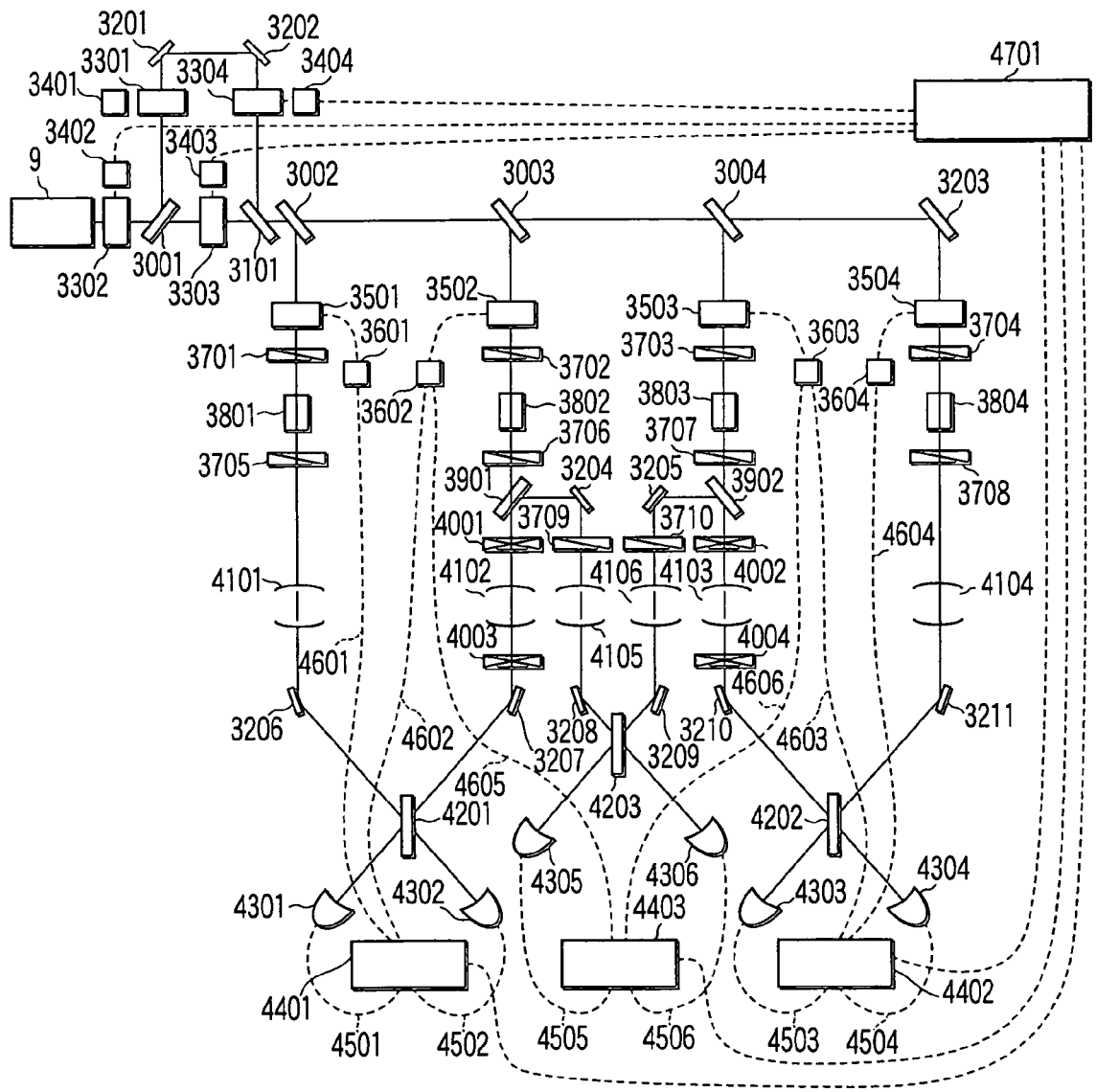
FIG. 13 is a view showing the schematic arrangement of the quantum communication apparatus according to Example 4.

Note that the atomic ensembles A(1) to A(4) correspond to crystals 5 to 8 in FIGS. 9 and 11, gas cells 3801 to 3804 in FIG. 13, and optical fibers 5601 to 5604 partly doped with Pr in FIG. 14.

EXAMPLE 1

First, four 2 mm×2 mm×2 mm $Y_2SiO_5$ crystals dispersed with $Pr^{3+}$ ions by 0.02% are prepared. The crystals are kept at a temperature of 1.4 K in cryostats 1 to 4 having optical windows.

Two ring dye laser sources are also prepared. One is a laser source whose frequency is stabilized to an angular frequency $\omega_2$ near 605.98 nm (16502.3 cm$^{-1}$). The other is a laser source whose frequency is so stabilized as to emit light with angular frequency $\omega_1=\omega_2-9.4\times10^{13}$ rad/s lower than that of light emitted from the above laser source by $9.4\times10^{13}$ rad/s (about 500 cm$^{-1}$). The light from the former ring dye laser source resonates with a transition between $^3H_4(1)$, the lowest Stark level of $Pr^{3+}$ in the crystal, and $^1D_2(1)$, an electronically excited state.

In Example 1, the apparatus shown in FIG. 9 is used. The crystals 5 to 8 as atomic ensembles A(1)-A(4) are irradiated with the respective laser beams and a generated photon is detected, thereby generating entanglement.

As shown in FIG. 9, the crystals 5 to 8 placed in the cryostats 1 to 4 having optical windows are arranged, and optical systems are set such that all the crystals can be irradiated with a light beam having the angular frequency $\omega_1$ from the ring dye laser source 9, and the crystals 6 and 7 can be irradiated with both light beams having the angular frequencies $\omega_2$ and $\omega_1$ from the ring dye laser source 10 and the ring dye laser source 9.

The output light from the ring dye laser source 9 passes through the electro-optical device 401 for sweeping the angular frequency of the output light, and is split by the beam splitter 201 with a transmittance of 50% and a reflectance of 50%. One of the split light passes through the acousto-optical device 301 for shifting the angular frequency to the lower energy by $17.3\times2\pi$ MHz, and also passes through the electro-optical device 402 for forming a light pulse train. The resultant light is combined with the light not subjected to an angular frequency shift at the half mirror 501. The electro-optical device 403 for shaping light into a light pulse train is also inserted in the other optical path from the beam splitter 201 to the half mirror 501. These members are used to initialize the energy state of a crystal to a lower one of two states different by $17.3\times2\pi$ MHz.

In operation other than initialization, a laser beam with the angular frequency $\omega_1$ which is transmitted through the beam splitter 201, of the output light from the ring dye laser source 9, passes through the electro-optical device (shutter) 403. The electro-optical device 403 is used as a shutter for forming the laser beam with the angular frequency $\omega_1$ which is transmitted through the beam splitter 201 into a light pulse train, and for switching to the ring dye laser source 10. The light pulse train with angular frequency $\omega_1$ is split into two light pulse trains by the beam splitter 202 with a transmittance of 50% and a reflectance of 50%. Each light pulse train is further split into two light pulse trains by the beam splitter 203 or 204 with a transmittance of 50% and a reflectance of 50%.

The respective split light pulse trains are guided to the mirrors 601 to 604 and the half mirrors 502 and 503. Prior to irradiating the respective crystals, the light pulse trains pass through the acousto-optical devices (optical shutters S1(1)-S1(4) using an acousto-optical effect) 302 to 305 and the λ/2 plates 701 to 704 for adjusting a polarization direction, and then they are incident on the crystals 5 to 8.

The crystals (A(1) and A(4)) 5 and 8 irradiated with the light pulse train emit a photon having the same polarization direction and propagating direction as that of the incident light. The photon passes through the λ/2 plate 705 or 708 and the Fabry-Perot resonator 801 or 804 as an optical filter F1(1) or F1(4). The optical resonators 801 and 804 are adjusted to resonate with light of $\omega_1-17.3\times2\pi$ MHz, and transmit the photon of $\omega_1-17.3\times2\pi$ MHz. These resonators 801 and 804, however, do not resonate with light of $\omega_1$, $\omega_2$, $\omega_2+17.3\times2\pi$ MHz and $\omega_2-17.3\times2\pi$ MHz and reflect them.

The photon emitted from the crystal (A(2) or A(3)) 6 or 7 passes through the λ/2 plate 706 or 707 for adjusting a polarization direction, and then passes through the polarization beam splitter (T(2) or T(3)) 901 or 902. The photon further passes through the λ/4 plate (polarizer P1(2) or P1(3)) 1001 or 1002 and is incident on the optical resonator 802 or 803 as an optical filter F1(2) or F1(3). The optical characteristics of the optical resonators 802 and 803 are the same as those of the optical resonators 801 and 804. The λ/2 plates 706 and 707 are adjusted such that the polarization direction of the photon of $\omega_1-17.3\times2\pi$ MHz emitted from the crystals 6 and 7, having the same polarization direction and propagating direction as those of the irradiation light (or the polarization direction of the photon of $\omega_2+17.3\times2\pi$ MHz generated when light of $\omega_2$ is irradiated) coincides with the transmission axis of the polarization beam splitters. The photon of $\omega_1-17.3\times2\pi$ MHz transmitted through the polarization beam splitter 901 or 902, the λ/4 plate 1001 or 1002, and the optical resonator 802 or 803 passes through the λ/4 plate (polarizer P2(2) or P2(3)) 1003 or 1004 to be restored to linearly polarized light even in the case where it is not linearly polarized.

The photons of $\omega_1-17.3\times2\pi$ MHz transmitted through the optical resonators 801 and 802, respectively, are superposed on each other at the beam splitter (B1(1)) 206 and then detected with photon detectors (D1(1) and D1(2)) 1101 and 1102. In this case, the λ/2 plate 705 is adjusted such that the polarization directions of the photons superposed at the beam splitter 206 coincide with each other. The photons of $\omega_1-17.3\times2\pi$ MHz transmitted through the optical resonators 803 and 804, respectively, are superposed at the beam splitter (B1(2)) 207 and detected with photon detectors (D1(3) and D1(4)) 1103 and 1104. In this case, the λ/2 plate 708 is adjusted such that the polarization directions of the photons superposed at the beam splitter 207 coincide with each other.

The output light from the ring dye laser source 10 passes through the shutter 404 utilizing an electro-optic effect for shaping light to be irradiated into a light pulse train and for switching a light source such that the crystals are irradiated with another light having a different angular frequency. The light pulse train is then split into two trains by the beam splitter 205 with a transmittance of 50% and a reflectance of 50%. Each light pulse train passes through the half mirror 502 or 503. Thereafter, respective light pulse trains pass through the same optical path as the light pulse train from the ring dye laser source 9, and then they are incident on the crystals 6 and 7.

The crystals 6 and 7 irradiated with the light pulse train of $\omega_2$ emit a photon of $\omega_2+17.3\times2\pi$ MHz. The photon passes through the λ/2 plate 706 or 707, passes through the polarization beam splitter (T(2) or T(3)) 901 or 902, passes through the λ/4 plate (P1(2) or P1(3)) 1001 or 1002, and is reflected by the optical resonator (F1(2) or F1(3)) 802 or 803. The reflected photon passes through the λ/4 plate (P1(2) or P1(3)) 1001 or 1002 again from the opposite side. At this time, since the λ/4 plate is adjusted such that the polarization direction of the photon is rotated by 90° with respect to the polarization direction of the photon when it has first passed through the λ/4 plate, the photon of $\omega_2+17.3\times2\pi$ MHz is reflected by the polarization beam splitter (T(2) or T(3)) 901 or 902 to the branched optical path. The photon passes through the λ/2 plate 709 or 710 in which the polarization direction thereof is adjusted, and then it is guided to the optical resonator 805 or 806 as an optical filter F2(2) or F2(3).

The optical resonators 805 and 806 are adjusted to resonate with light of $\omega_2 + 17.3 \times 2\pi$ MHz, and transmit the photon of $\omega_2 + 17.3 \times 2\pi$ MHz. These resonators 805 and 806, however, do not resonate with light of $\omega_1$, $\omega_2$, and $\omega_2 - 17.3 \times 2\pi$ MHz and reflect them. The photons of $\omega_2 + 17.3 \times 2\pi$ MHz transmitted through the optical resonators 805 and 806, respectively, are superposed at the beam splitter (B2(1)) 208 and then detected with photon detectors (D2(2) and D2(3)) 1105 and 1106.

In the above optical systems, when photons generated upon irradiation of crystals with light from the ring dye laser source are to be superposed at the beam splitter, the timing of irradiated light pulses and the optical path lengths are adjusted such that the generated photons can encounter synchronously at the beam splitter.

In addition, the intensity and pulse width of the light pulse applied to crystals are adjusted, when light of $\omega_1$ is to be applied, such that the mean number of photons emitted upon irradiation of light, the photon having the same polarization direction and propagating direction as those of the irradiated light, becomes sufficiently smaller than 1.

As the photon detectors 1101 to 1106, avalanche photodiodes cooled to 6 K are used. Outputs from the photon detectors 1101 and 1102, outputs from the photon detectors 1103 and 1104, and outputs from the photon detectors 1105 and 1106 are sent to signal processing circuits 1201, 1202, and 1203, respectively. Upon reception of a photon detection signal 1301 or 1302 from either one of the two connected photon detectors 1101 and 1102, the signal processing circuit 1201 immediately sends control signals 1501 and 1502 for closing shutters to acousto-optical device drivers 1401 and 1402. Upon reception of a photon detection signal 1303 or 1304 from either one of the two connected photon detectors, the signal processing circuit 1202 immediately sends control signals 1503 and 1504 for closing shutters to acousto-optical device drivers 1403 and 1404. As a result, the acousto-optical devices 302 and 303, and the acousto-optical devices 304 and 305 are close, respectively. Upon reception of a photon detection signal 1305 or 1306 from either one of the two connected photon detectors 1105 and 1106, the signal processing circuit 1203 immediately sends control signals 1505 and 1506 for closing shutters to the acousto-optical device drivers 1402 and 1403. As a result, the optical shutters 303 and 304 are closed.

The drivers 1601 to 1604 for the electro-optical devices 401 to 404 and the signal processing circuits 1201, 1202, and 1203 are connected to a control circuit 1701 for controlling the overall apparatus. This arrangement can control ON and OFF of outputs from the ring dye laser sources 9 and 10, control the pulse light generation and its timing, and initialize the signal processing circuits to open all or some of the acousto-optical devices 302 to 305 or perform initialization by irradiating crystals with light in a specific state in accordance with predetermined programs while reading out conditions such as which optical shutters are closed, as input signals.

The following operation is executed in the optical systems having the above arrangement and the control system for optical elements such as optical shutters.

First, the electro-optical devices 402 and 403 are opened and closed to generate light pulses and the acousto-optical devices 302 to 305 are opened while the electro-optical device 404 is closed. In these conditions, the frequency of light from the ring dye laser source 9 is shifted with the electro-optical device 401. Assumed that the angular frequency after the frequency shift is represented by $\omega_A$, the crystals 5 to 8 are irradiated with dual wavelength light consisting of light of angular frequency $\omega_A - 17.3 \times 2\pi$ MHz transmitted through the acousto-optical device 301 and light of angular frequency $\omega_A$ which is not transmitted through the acousto-optical device 301. In this case, the waveforms of the two types of light pulses generated by using electro-optical devices 402 and 403 are shaped such that they have the same pulse width and are formed into mountainous waveforms with smooth footings.

The timings of pulsed light beams are set such that a pulse of $\omega_A$ is applied before a pulse of $\omega_A - 17.3 \times 2\pi$ MHz and a delay corresponding to about a half width of a pulse is produced to each other so as to overlap with each other temporarily. The pair of light pulses are applied to each crystal within the range of about ±5 GHz centered on $\omega_1$ while the angular frequency $\omega_A$ is changed by $1 \times 2\pi$ MHz at a time. With this operation, an ion at the $^3H_4(1)$ level, the electron ground state, of $Pr^{3+}$ ions in the crystal, is prepared in the lower one of the two energy levels of hyperfine structure levels apart from each other by energy corresponding to an angular frequency of $17.3 \times 2\pi$ MHz.

A laser used for the above initialization of the crystals is one also used for entanglement connection (to be described later). However, the above initialization can be performed with a laser dedicated to initialization. When entanglement generation and connection are to be performed between distant sites, in particular, lasers dedicated to initialization may be arranged and used near the respective physical system ensembles.

In the first stage, the acousto-optical devices 302 to 305 are opened while the electro-optical devices 404 and 402 are closed. In addition, a light pulse train with the angular frequency $\omega_1$ is generated with the electro-optical device 403 while the effect of frequency shift of the electro-optical device 401 is disabled. The crystals 5 to 8 are then irradiated with the light pulse train. As a result, photons with the angular frequency $\omega_1 - 17.3 \times 2\pi$ MHz generated from the respective crystals 5 to 8 are superposed on each other at the beam splitters and detected with the photon detectors. With triggered by this operation, the acousto-optical devices 302 to 305 are closed correspondingly. After all the acousto-optical devices 302 to 305 are closed, the control circuit 1701 starts the second stage. That is, the electro-optical device 403 is closed, and the electro-optical device 404 starts to generate a light pulse train of $\omega_2$ instead. The acousto-optical devices 303 and 304 are opened, and the crystals 6 and 7 are irradiated with light pulses of $\omega_2$. The photons with the angular frequency $\omega_2 + 17.3 \times 2\pi$ MHz generated from the crystals are superposed at the beam splitter 208 and detected with the photon detectors 1105 and 1106. With triggered by this operation, the acousto-optical devices 303 and 304 are closed correspondingly.

All the series of operations are automatically performed within, for example, about 10 µs. As a consequence, entanglement can be generated between the $Pr^{3+}$ ion ensemble contained in the crystal 5 and the $Pr^{3+}$ ion ensemble contained in the crystal 8.

According to the above arrangement, entanglement is generated between two spatially separated atomic ensembles, and two pairs of entanglement ensembles are connected within a short period of time, thereby generating entanglement over a longer distance. In addition, the light sources, optical systems, and control system used in this Example can constitute an apparatus for generating entanglement.

The fact that entanglement has been generated between A(1) and A(4) with the above quantum communication apparatus can be confirmed as follows.

Figure 10:
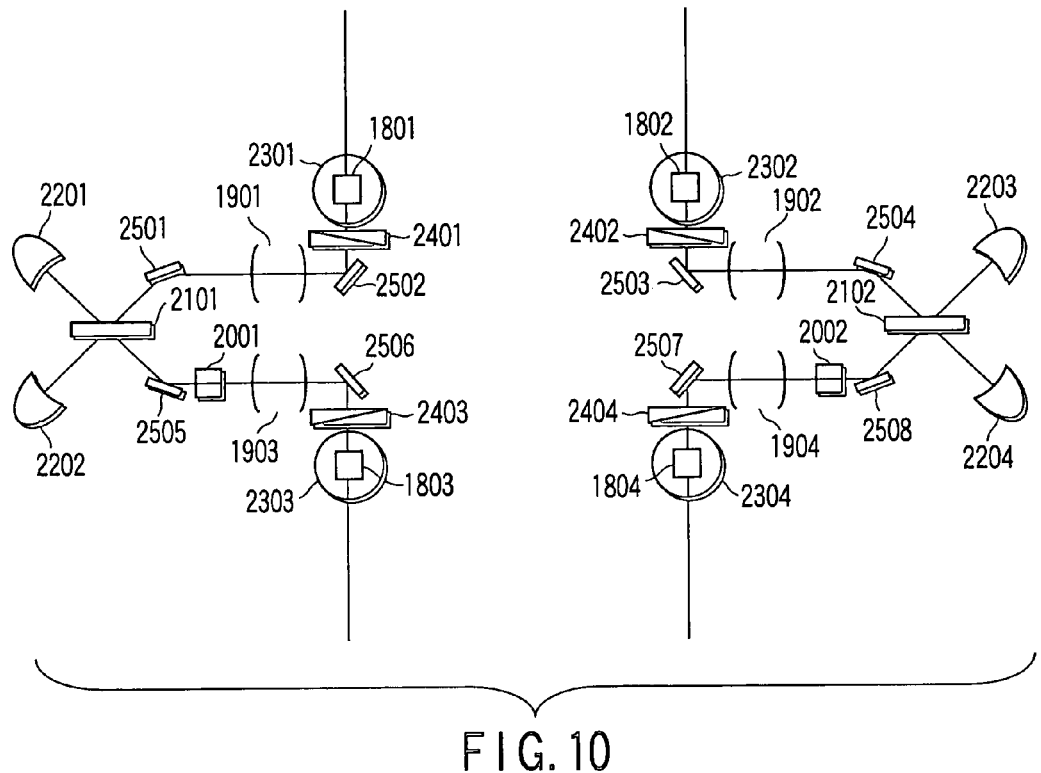
FIG. 10 is a view for explaining a method of confirming entanglement generation.

Two entanglement generating systems like that described above are constructed, and two pairs of $Pr^{3+}$ ion ensembles are prepared, where entanglement has been generated for each pair of ensembles. FIG. 10 shows this state. The following description will be made with reference to FIG. 10. Referring to FIG. 10, one of the first pair of $Pr^{3+}$ ion ensembles is the ion ensemble 1801, and the other is the ion ensemble 1802. One of the second pair of $Pr^{3+}$ ion ensembles is the ion ensemble 1803, and the other is the ion ensemble 1804.

As schematically shown in FIG. 10, when ion ensembles connected through two pairs of entanglement ensembles are generated, the ion ensembles 1801 and 1803 and the ion ensembles 1802 and 1804 are simultaneously irradiated with light pulses of $\omega_2$. The photon of $\omega_2+17.3\times2\pi$ MHz generated upon application of the light pulses is transmitted through optical resonator 1901 to 1904 which resonates with the angular frequency of the photon and selectively transmit the photon. Thereafter, the phase modulator 2001 shifts the phase of the photon generated from the ion ensemble 1803 by $\phi_a$, and the phase modulator 2002 shifts the phase of the photon generated from the ion ensemble 1804 by $\phi_b$.

After the phase shifts, the photons generated from the ion ensembles 1801 and 1803 are superposed at the beam splitter 2101. After the superposition, photons propagating in two directions can be detected with photon detector 2201 or 2202. The photons generated from the ion ensembles 1802 and 1804 are superposed at the beam splitter 2102. After the superposition, the photons propagating in two directions can be detected with photon detector 2203 or 2204.

When the respective ion ensembles are irradiated with light pulses, and one of the photon detectors 2201 and 2202 and one of the photon detectors 2203 and 2204 are to simultaneously detect photons, a specific combination of detectors that simultaneously detect the photons is determined by the phase difference $\phi_a-\phi_b$ if entanglement connections have been generated between the ion ensembles 1801 and 1802 and between the ion ensembles 1803 and 1804.

With regard to photon generation and detection concerning ion ensembles, by properly setting a phase modulation offset, the combination of the photon detectors 2201 and 2203 or the combination of the photon detectors 2202 and 2204 can always be set as a combination of photon detectors to be used for simultaneous detection of photons when $\phi_a=\phi_b=0$ or $\phi_a=\phi_b=\pi/2$. In addition, when $\phi_a=0$ and $\phi_b=\pi/2$, or $\phi_a=\pi/2$ and $\phi_b=0$, another combination can be used for simultaneous detection of photons. If the above situation is observed, in this Example, it makes possible to finally confirm that the entanglement has been actually generated between ion ensembles in the two crystals, in which entanglement generation is expected.

Quantum cryptography (sharing a random numbers table) can be executed by using the above two pairs of ion ensembles connected through entanglement, for example, in the following manner. Assume that, of two persons who want to share a random numbers table, the first person sets $\phi_a$ to 0 or $\pi/2$ by using the phase modulator 2001 and can know the photon detection results obtained by the photon detectors 2201 and 2202. Assume also that the second person sets $\phi_b$ to 0 or $\pi/2$ and can know the photon detection results obtained by the photon detectors 2203 and 2204.

Two pairs of ion ensembles connected through entanglement are generated. The first and second persons set $\phi_a$ and $\phi_b$ to 0 or $\pi/2$ randomly with the same frequency, and detect photons generated upon irradiation of crystals with light. In this case, the first person records "0" when the photon detector 2201 detects a photon, and records "1" when the photon detector 2201 detects a photon. In addition, the first person records the set value of $\phi_a$. The second person records "0" when the photon detector 2203 detects a photon, and records "1" when the photon detector 2204 detects a photon. In addition, the second person records the set value of $\phi_b$.

By repeating this operation starting from ensemble generation several times, the first and second persons can obtain numeral sequences. When the first and second persons exchange log information of phase settings and extract only numerals when $\phi_a=\phi_b$ occurs accidentally, the first and second persons can obtain a common random numbers table. It is known that this method provides safety against tapping for information about a random numbers table from a quantum-mechanical point of view.

A system for the entanglement confirmation described above can be incorporated in the optical system shown in FIG. 9 by inserting polarizers utilizing an acousto-optical effect in the optical paths of photons generated from the crystals 5 and 8 and transmitted through the $\lambda/2$ plates 705 and 708 at positions immediately after the $\lambda/2$ plates. By performing above operation immediately after entanglement generation, whether or not entanglement is actually generated can be checked.

EXAMPLE 2

In Example 1, the optical paths extending from the half mirror 501 to the acousto-optical devices 302 to 305 arranged for light applied to the crystals 5 to 8 and the optical paths extending from the electro-optical device 404 to the acousto-optical devices 303 and 304 are formed of a free space in which light is propagated according to mirrors that determine the direction of light. In contrast to this, in Example 2, light is made to propagate in optical fibers, and entanglement is generated between $Pr^{3+}$ ion ensembles of crystals 5 and 8 as in Example 1.

The light transmitted through or reflected by the half mirror 501 is converged by the lens 2601 (see FIG. 11 hereinafter) and is incident on the optical fiber 2701 so as to propagate therein. The light transmitted through the electro-optical device 404 is converged by the lens 2602 and is incident on the optical fiber 2702 so as to propagate therein. The functions of the beam splitters or half mirrors in Example 1 are replaced with fiber optical couplers 2801 to 2806, and outputs from the fibers are restored to parallel light through lenses 2603 to 2606 before optical shutters corresponding to the respective crystals.

Using optical fibers in this manner can easily detour around obstacles when the respective crystals are placed apart from each other to generate entanglement over a practical long distance. In addition, there is a low possibility that any obstacle enters optical paths after installation. Further, the optical paths can be easily maintained owing to no need of mirror adjustment.

EXAMPLE 3

In Example 1, acousto-optical devices are used for the optical shutters 302 to 305. In contrast to this, in Example 3, the optical shutters 302 to 305 are replaced with shutters using electro-optical devices. As a consequence, the operation speed of the overall entanglement generation system can be improved, and the time necessary for entanglement connection can be shortened as compared with Example 1. The time necessary for entanglement generation except for an initialization process for crystals, in particular, can be shortened to ⅒. That is, the construction in this Example 3 is effective for entanglement generation between distant sites based on multistage entanglement connection.

EXAMPLE 4

In Example 1, the crystals 5 to 8 placed in the cryostats 1 to 4 are used as the atomic ensembles A(i). In Example 4, rubidium atoms encapsulated in gas cells are used as atomic ensembles A(i).

Figure 12:
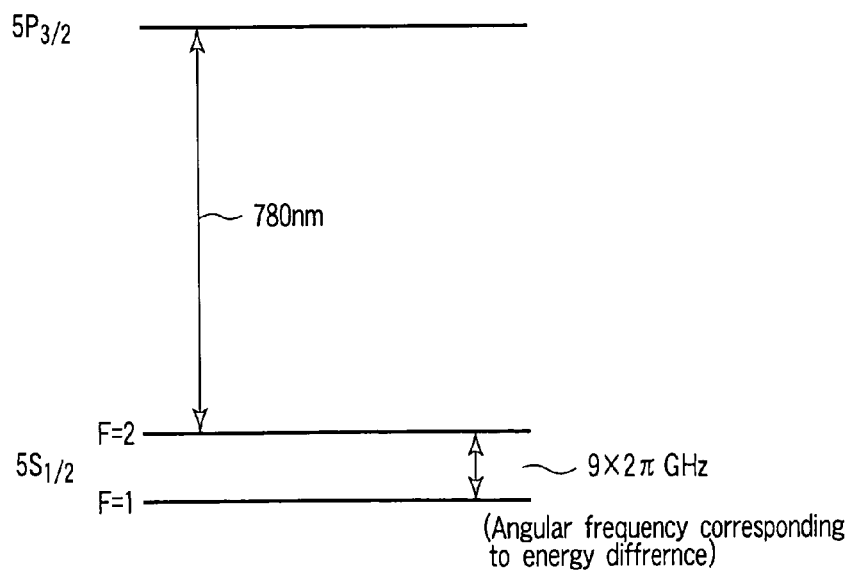
FIG. 12 is a view for explaining the energy levels of atomic ensembles A(i) in the quantum communication apparatus according to Example 4.

Of the energy levels of a rubidium atom, the levels associated with Example 4 are schematically shown in FIG. 12. FIG. 13 shows the arrangement of optical paths, optical elements, and the like used in this Example.

In Example 4, the angular frequency of light from the stabilized ring dye laser source 9 in Example 1 is changed to an angular frequency (about 780 nm) resonant with the transition between the F=2 state (a higher one of the two hyperfine structure levels, i.e., the F=1 state and the F=2 state) of $5S_{1/2}$ that is the ground state of a rubidium atom and $5P_{3/2}$ that is a higher level. Also, in place of the light from the stabilized ring dye laser source 10 in Example 1, light split from light emitted from the ring dye laser source 9 is used. In addition, optical elements and optical resonators having wavelength dependency are replaced with those conforming to the transition of rubidium. Furthermore, the acousto-optical device 301 in Example 1 is replaced with an electro-optical device 3301. The angular frequency shift by this element is set to 9×2π GHz (which corresponds to the energy difference between the F=1 state and the F=2 state which are the ground states of rubidium) instead of 17.3×2π MHz (Mrad/s). In initialization, the range of frequency change by the electro-optical device 401, which is ±5 GHz in Example 1, is set to ±2 GHz by using an electro-optical device 3302. Operations similar to those in Example 1 are performed while changes are made in conformity with a rubidium atom in the above manner.

Note that the pulse interval in forming a light pulse train is adjusted such that photons generated from gas cells can be superposed at a beam splitter. In Example 4, beam splitters 3002 to 3004 and a mirror 3203 are arranged at equal intervals, and the optical path lengths from the beam splitters and the mirror to the gas cells are set to be equal to each other, and so are the optical path lengths from the gas cells to beam splitters 4201 to 4203 which superpose photons from the gas cells. A light pulse train is therefore generated such that the propagating time of a light pulse between adjacent ones of the beam splitters 3002 to 3004 corresponds to the time interval of pulses.

With this arrangement, entanglement can be generated between rubidium atom ensembles 3801 and 3804 by operations similar to those in Example 1. In addition, Example 4, only light obtained from a single light source is used. Therefore, there is no need to switch irradiation wavelengths in entanglement generation and connection processes except for initialization.

EXAMPLE 5

FIG. 14 is a view showing the schematic arrangement of a quantum communication apparatus according to Example 5. As shown in FIG. 14, in the quantum communication apparatus according to Example 5, of the portions of the optical paths in Example 4 which cause light to propagate in a free space, the optical paths from the half mirror 3101 to positions before the optical shutters 3501 to 3504 are replaced with optical fibers 4802 to 4804. In addition, the gas cells to be irradiated with light are replaced with optical fibers 5601 to 5604 whose core portions are dispersed with Pr ions, the ion-dispersed portions are held in liquid helium kept at 1.4 K under a reduced pressure. The optical paths are replaced with optical fibers by using condenser lenses 4901 to 4911 for light input and lenses 4912 to 4925 for converting light output from the fibers into parallel light. In addition, the beam splitters used in Example 4 are replaced with fiber optical couplers 5001 to 5006.

Entanglement can be generated between Pr ion ensembles in fibers by the same method as that in Example 4 upon adjusting the angular frequency of laser light to be applied, the angular frequency dependence of each optical element to be used, the sweep range of angular frequencies in initialization, and the like in accordance with the values for Pr ions in the fibers. In Example 5, since optical fibers are used for most of the optical paths, when this apparatus is used as a quantum communication apparatus, there is no need for maintenance including optical system adjustment and the like. In addition, optical elements such as photon detectors can be arranged relatively easily and freely.

EXAMPLE 6

Example 6 uses porous fibers having minute cavities formed in the circumferential portions of the cores in place of the portions obtained by dispersing Pr ions in the cores of the optical fibers in Example 5. The cavities of these fibers are filled with rubidium gas, and entanglement generation is performed by the same method as that in Example 5 without cooling the rubidium gas.

According to this arrangement, evanescent light passing through the waveguide portions of the cores interacts with the rubidium gas in the cavities, thereby generating entanglement between rubidium gas ensembles in the same manner as in Example 4.

EXAMPLE 7

In Example 7, gas cells used in Example 4 are held in a ring resonator, and entanglement is generated by a method similar to that in Example 4. This Example 7 uses a resonator that resonates with an angular frequency corresponding to the energy of a photon generated from each rubidium atom ensemble in generating entanglement in the first stage.

Figure 15:
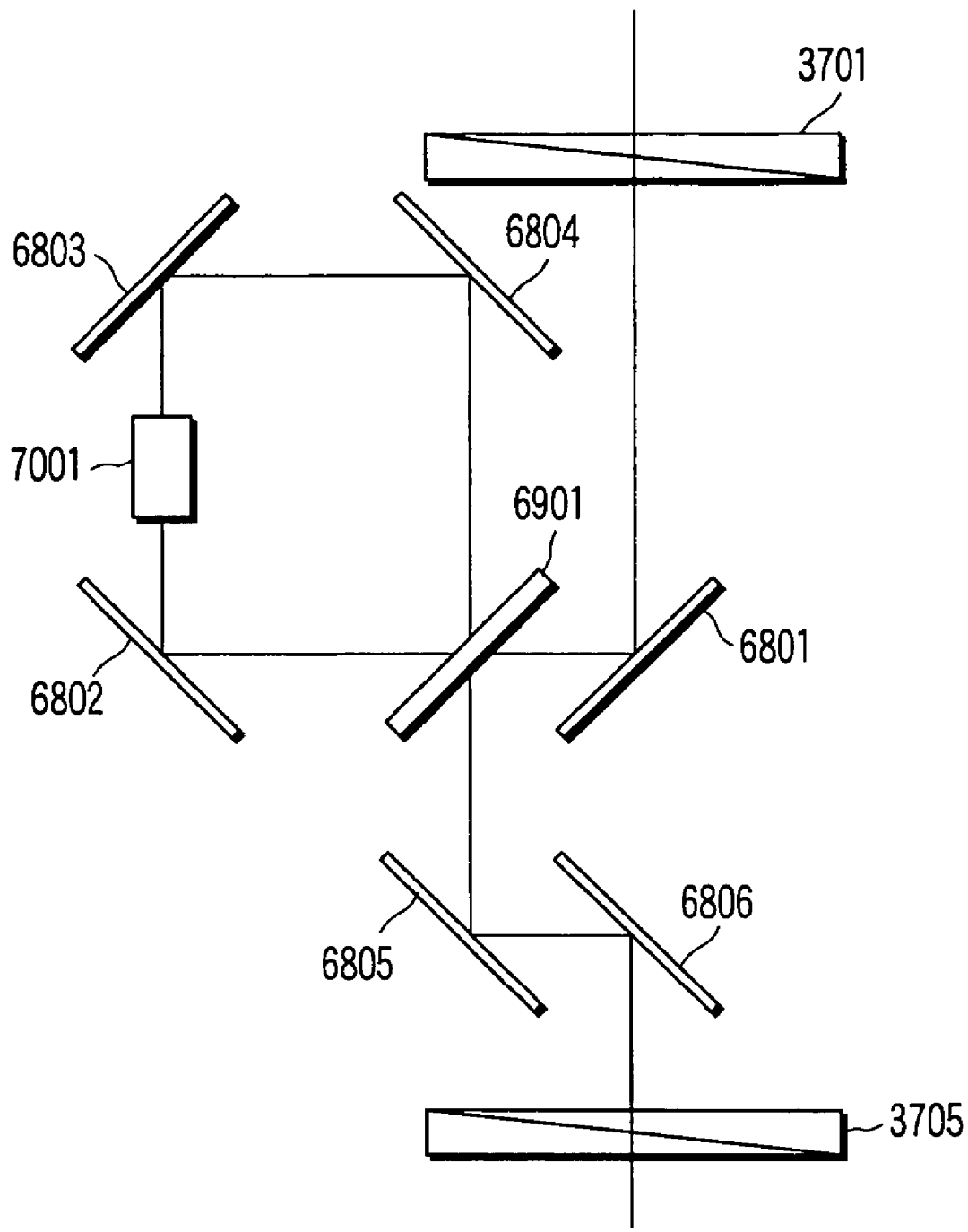
FIG. 15 is a view showing the arrangement of a ring resonator containing a gas cell in the quantum communication apparatus according to Example 7.

FIG. 15 is a view showing the arrangement of a ring resonator containing a gas cell 7001 in a quantum communication apparatus according to Example 7. FIG. 15 shows one of ring resonators containing gas cells replacing the four gas cells between the λ/2 plates 3701 and 3705, the λ/2 plates 3702 and 3706, the λ/2 plates 3703 and 3707, and the λ/2 plates 3704 and 3708 in Example 4. The three remaining portions are also replaced with arrangements similar to that shown in FIG. 15.

With this arrangement, entanglement generation can be efficiently performed even by application of relatively weak laser light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum communication apparatus, comprising:
n numbers of ensembles denoted as A(i), where i=1, 2, 3, ..., n, n being $2^r$, and r is an integer of 2 or more, each ensemble comprising a plurality of physical systems comprising:
  at least one physical system having at least three energy levels of a first level, a second level and a third level in ascending order, in which an angular frequency corresponding to an energy difference between the first and second levels is denoted as $\omega_{12}$;
  a physical system in a state of the first level capable of generating a first photon of an angular frequency $\omega_1-\omega_{12}$ when irradiated with coherent pulsed light of an angular frequency $\omega_1$ having a first detuning with respect to a transition between the first level and the third level;
  and a physical system in a state of the second level capable of generating a second photon of an angular frequency $\omega_2+\omega_{12}$ when irradiated with coherent pulsed light of an angular frequency $\omega_2$ having a second detuning with respect to a transition between the second level and the third level, where the first detuning is larger than the second detuning;
an optical system for the ensemble A(1), comprising:
  an optical shutter S1(1) disposed in an optical path for pulsed light to A(1);
  and an optical filter F1(1), disposed in an optical path for a photon generated from A(1), which selectively transmits the first photon;
an optical system for the ensemble A(n), comprising:
  an optical shutter S1(n) disposed in an optical path for pulsed light to A(n); and
  an optical filter F1(n), disposed in an optical path for a photon generated from A(n), which selectively transmits the first photon;
an optical system for the ensemble A(j), where j=2, 3, 4, ..., n−1 comprising: an optical shutter S1(j) disposed in an optical path for pulsed light to A(j); a polarization beam splitter T(j), disposed in an optical path for a photon generated from A(j), which is set to a direction to transmit the first photon and the second photon; a polarizer P1(j), disposed in an optical path for the photon transmitted through the polarization beam splitter T(j), which transmits the first and second photons in which a polarization direction of the second photon is rotated; an optical filter F1(j), disposed in an optical path for the photon transmitted through the polarizer P1(j), which transmits the first photon and reflects the second photon; a polarizer P2(j), disposed in an optical path for the photon transmitted through the optical filter F1(j), which adjusts polarization of the first photon; and an optical filter F2(j), disposed in an optical path, branched from the polarization beam splitter T(j), for the photon reflected by the optical filter F1(j), re-transmitted through the polarizer P1(j), and reflected by the polarization beam splitter T(j) to the branched optical path, which selectively transmits the second photon;
a control circuit configured to selectively open optical shutters corresponding to a particular set of ensembles to be irradiated with pulsed light;
beam splitters B1(k), where k=1, 2, 3, ..., n/2 configured to superpose the photon generated from the ensemble A(2×k−1) and transmitted through the optical filter F(2×k−1), and the photon generated from the ensemble A(2×k) and transmitted through the optical filter F(2×k);
pairs of photon detectors D1(2×k−1) and D1(2×k) detecting a photon output from the beam splitter B1(k) in two directions, respectively;
beam splitters B2(l) (l=1, 2, 3, ..., (n/2)−1) configured to superpose the second photon generated from the ensemble A(2×l), transmitted through the polarization beam splitter T(2×l), transmitted through the polarizer P1(2×l), reflected by the optical filter F1(2×l), re-transmitted through the polarizer P1(2×l), reflected by the polarization beam splitter T(2×l) to a branched optical path and transmitted through the optical filter F1(2×l), the second photon generated from the ensemble A(2×l+1), transmitted through the polarization beam splitter T(2×l+1), transmitted through the polarizer P1(2×l+1), reflected by the optical filter F1(2×l+1), re-transmitted through the polarizer P1(2×l+1), reflected by the polarization beam splitter T(2×l+1) to a branched optical path and transmitted through the optical filter F1(2×l+1);
pairs of photon detectors D1(2×l) and D1(2×l+1) detecting a photon output from the beam splitter B2(l) in two directions, respectively; and
signal processing circuits connected to the respective pairs of photon detectors and configured to generate signals to close the two optical shutters corresponding to the two ensembles participated in photon detection with either one of a particular pair of photon detectors.

2. The apparatus according to claim 1, wherein optical transitions between the first level and the third level and between the second level and the third level are allowed, and an optical transition between the first level and the second level is substantially forbidden.

3. The apparatus according to claim 1, further comprising two light sources including a first light source for emitting coherent pulsed light of the angular frequency $\omega_1$ and a second light source for emitting coherent pulsed light of the angular frequency $\omega_2$.

4. The apparatus according to claim 1, further comprising a single light source for emitting coherent pulsed light of an angular frequency $\omega_3$, the angular frequency $\omega_3$, being used as the coherent pulsed light of the angular frequency $\omega_1$ and the coherent pulsed light of the angular frequency $\omega_2$.

5. The apparatus according to claim 1, further comprising beam splitters corresponding to the respective optical shutters between a single light source and the respective optical shutters.

6. The apparatus according to claim 1, wherein at least part of the optical paths through is formed of an optical fiber.

7. The apparatus according to claim 1, wherein the optical shutter is selected from an electro-optical device and acousto-optical device.

8. The apparatus according to claim 1, wherein the physical system ensemble is an ensemble of rare-earth ions dispersed in a solid material.

9. The apparatus according to claim 1, wherein the physical system ensemble is an ensemble of rare-earth ions dispersed in an optical fiber.

10. The apparatus according to claim 1, wherein the physical system ensemble is an ensemble of gas molecules held in a closed space.

11. The apparatus according to claim 1, wherein the physical system ensemble is placed in an optical resonator.

12. A quantum communication method using the apparatus according to claim 1, comprising:
  preparing the physical systems of the ensembles A(i) in the first level;

performing a first stage operation to generate entanglement between adjacent two ensembles A(2×k−1) and A(2×k), the first stage operation comprising:

opening all the optical shutters S1(i) and irradiating all the ensembles A(i) with coherent pulsed light of the angular frequency $\omega_1$;

superposing, at the beam splitter B1(k), the first photon generated from the ensemble A(2×k−1) and transmitted through the optical filter F1(2×k−1), and the first photon generated from the ensemble A(2×k) and transmitted through the optical filter F1(2×k); and closing the optical shutters S1(2×k−1) and S1(2×k) when either one of the paired photon detectors D1(2×k−1) and D1(2×k) detects a photon output from the beam splitter B1(k) in the two directions such that all the optical shutters which have been opened are closed;

performing a second stage operation to generate entanglement between two ensembles on the both ends of a set of adjacent four ensembles, the second stage operation comprising:

opening the optical shutters S1(4×m−2) and S1(4×m−1), where m=1, 2, 3, . . . , n/4 and irradiating the ensembles A(4×m−2) and A(4×m−1) with coherent pulsed light of the angular frequency $\omega_2$;

superposing, at the beam splitter B2(2×m−1), the second photon generated from the ensemble A(4×m−2), transmitted through the polarization beam splitter T(4×m−2), transmitted through the polarizer P1(4×m−2), reflected by the optical filter F1(4×m−2), re-transmitted through the polarizer P1(4×m−2), reflected by the polarization beam splitter T(4×m−2) to a branched optical path and transmitted through the optical filter F1(4×m−2), and the second photon generated from the ensemble A(4×m−1), transmitted through the polarization beam splitter T(4×m−1), transmitted through the polarizer P1(4×m−1), reflected by the optical filter F1(4×m−1), re-transmitted through the polarizer P1(4×m−1), reflected by the polarization beam splitter T(4×m−1) to a branched optical path and transmitted through the optical filter F1(4×m−1); and closing the optical shutters S1(4×m−2) and S1(4×m−1) when either one of the paired photon detectors D1(4×m−2) and D1(4×m−2) detects a photon output from the beam splitter B2(2×m−1) in the two directions such that all the optical shutters which have been opened are closed;

performing a q-th stage operation, where q is an integer from 3 to r, to generate entanglement between two ensembles on the both ends of a set of adjacent ensembles twice the previous stage, the q-th stage operation comprising:

opening the optical shutters $S1(2^q \times m_q - 2^{q-1})$ and $S1(2^q \times m_q - 2^{q-1}+1)$, where $m_q = 1, 2, 3, \ldots, n/2^q$ and irradiating the ensembles $A(2^q \times m_q - 2^{q-1})$ and $A(2^q \times m_q - 2^{q-1}+1)$ with coherent pulsed light of the angular frequency $\omega_2$; and closing the optical shutters $S1(2^q \times m_q - 2^{q-1})$ and $S1(2^q \times m_q - 2^{q-1}+1)$ when either one of the paired photon detectors $D2(2^q \times m_q - 2^{q-1})$ and $D2(2^q \times m_q - 2^{q-1}+1)$ detects a photon such that all the optical shutters which have been opened are closed; and repeatedly performing later stage operations from a (q+1)-th stage to a r stage ($r = \log_2 n$) corresponding to the q-th stage operation to generate entanglement between two ensembles A(1) and A(n) on the both ends of all the ensembles.

13. The method according to claim 12, wherein coherent pulsed light of an angular frequency $\omega_3$ is used as the coherent pulsed light of the angular frequency $\omega_1$ and the coherent pulsed light of the angular frequency $\omega_2$.

* * * * *

UNITED STATES PATENT AND TRADEMARK OFFICE
CERTIFICATE OF CORRECTION

PATENT NO. : 7,406,173 B2 Page 1 of 1
APPLICATION NO. : 10/676160
DATED : July 29, 2008
INVENTOR(S) : Ichimura et al.

It is certified that error appears in the above-identified patent and that said Letters Patent is hereby corrected as shown below:

Claim 1, column 24, line 14, change "$T(2 \times l-1)$," to --$T(2 \times l+1)$,--.

Claim 4, column 24, line 40, change "$\omega_3$, being" to --$\omega_3$ being--.

Signed and Sealed this

Thirtieth Day of September, 2008

JON W. DUDAS
*Director of the United States Patent and Trademark Office*